(12) United States Patent
Kumar et al.

(10) Patent No.: US 10,229,065 B2
(45) Date of Patent: Mar. 12, 2019

(54) UNIFIED HARDWARE AND SOFTWARE TWO-LEVEL MEMORY

(71) Applicant: Intel Corporation, Santa Clara, CA (US)

(72) Inventors: Mohan J. Kumar, Aloha, OR (US); Murugasamy K. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,460

(22) Filed: Dec. 31, 2016

(65) Prior Publication Data

US 2018/0189188 A1 Jul. 5, 2018

(51) Int. Cl.
*G06F 3/06* (2006.01)
*G06F 12/1009* (2016.01)

(52) U.S. Cl.
CPC ........ *G06F 12/1009* (2013.01); *G06F 3/0604* (2013.01); *G06F 3/067* (2013.01); *G06F 3/0629* (2013.01); *G06F 3/0659* (2013.01); *G06F 3/0683* (2013.01); *G06F 2212/152* (2013.01); *G06F 2212/154* (2013.01); *G06F 2212/261* (2013.01); *G06F 2212/263* (2013.01); *G06F 2212/657* (2013.01)

(58) Field of Classification Search
CPC .. G06F 12/1009; G06F 3/0604; G06F 3/0629; G06F 3/067; G06F 3/0683
See application file for complete search history.

(56) References Cited

U.S. PATENT DOCUMENTS

| | | | | |
|---|---|---|---|---|
| 2013/0275682 | A1* | 10/2013 | Ramanujan | G06F 13/1684 711/122 |
| 2014/0129767 | A1* | 5/2014 | Ramanujan | G06F 12/0897 711/105 |
| 2014/0297919 | A1* | 10/2014 | Nachimuthu | G11C 14/009 711/102 |
| 2017/0249250 | A1* | 8/2017 | Ramanujan | G06F 12/0897 |
| 2017/0286210 | A1* | 10/2017 | Yigzaw | G06F 11/0793 |

* cited by examiner

*Primary Examiner* — Than Nguyen
(74) *Attorney, Agent, or Firm* — Law Office of R. Alan Burnett; R. Alan Burnett

(57) ABSTRACT

Unified hardware and software two-level memory mechanisms and associated methods, systems, and software. Data is stored on near and far memory devices, wherein an access latency for a near memory device is less than an access latency for a far memory device. The near memory devices store data in data units having addresses in a near memory virtual address space, while the far memory devices store data in data units having addresses in a far memory address space, with a portion of the data being stored on both near and far memory devices. In response to memory read access requests, a determination is made to where data corresponding to the request is located on a near memory device, and if so the data is read from the near memory device; otherwise, the data is read from a far memory device. Memory access patterns are observed, and portions of far memory that are frequently accessed are copied to near memory to reduce access latency for subsequent accesses.

19 Claims, 17 Drawing Sheets

UNIFIED HARDWARE AND SOFTWARE TWO-LEVEL MEMORY

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," which are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and shared storage resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers are installed, such as blade server chassis and server blades.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

The cloud-hosted services are generally categorized as Software as a Service (SaaS), Platform as a Service (PaaS), and Infrastructure as a Service (IaaS). SaaS services, also commonly called Web services and cloud application services, enable access to services running on datacenter servers via a network connection and client-side interface, such as a Web browser. Well-known examples of SaaS services include e-mail Web services (e.g., Google gmail, Microsoft Hotmail, Yahoo mail), Microsoft Office 365, Salesforce.com and Google docs. PaaS, also known as cloud platform services, are used for applications and other development, while providing cloud components to software. Examples of PaaS include Amazon Web Services (AWS) Elastic Beanstalk, Windows Azure, and Google App Engine.

IaaS are services for accessing, monitoring, and managing remote datacenter infrastructures, such as computer (virtualized or bare metal), storage, networking, and networking services (e.g., Firewalls). Instead of purchasing and running their own physical hardware, users can purchases IaaS based on consumption. For example, AWS and Windows Azure respectively offer use of Amazon and Microsoft datacenter resources on a resource allocation/consumption basis. Amazon Elastic Compute Cloud (EC2) is a central part of AWS.

IaaS usage for a given customer typically involves allocation of data center resources. For example, a typical AWS user may request use of one of 24 different EC2 instances, which range from a t2.nano instance with 0.5 Gigabyte (GB) of memory, 1 core/variable cores/compute units and no instance storage to an hs1.8xlarge with 117 GB of memory, 16/35 cores/compute units and 48000 GB of instance storage. Each allocated EC2 instance consumes certain physical datacenter resources (e.g. compute, memory storage). At the same time, datacenter racks may support a multitude of different configurations. To maximum resource allocation, the IaaS operator needs to track what resources are available in which rack.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
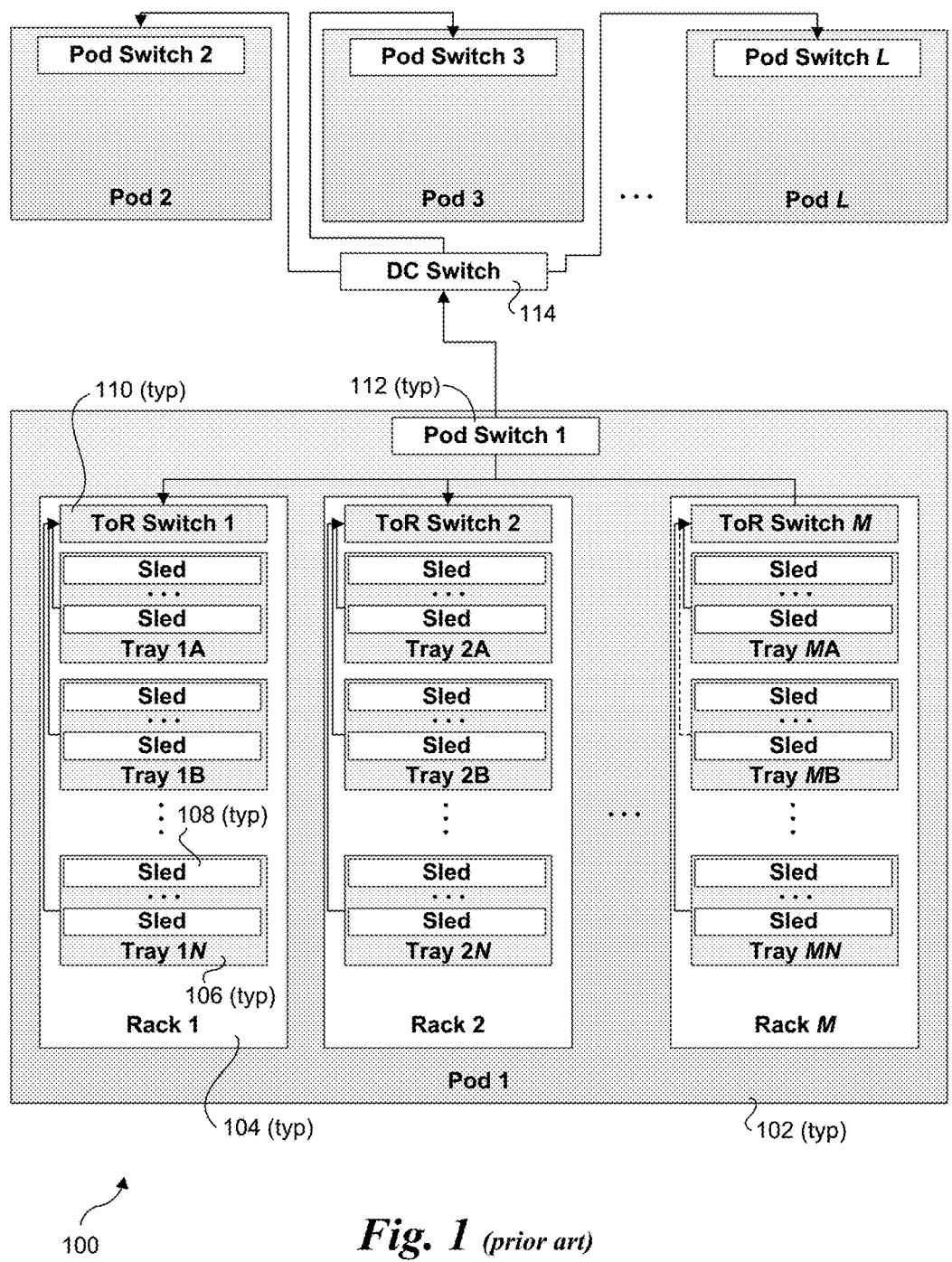
FIG. 1 is a schematic diagram of a conventional physical rack configuration in a data center.

Embodiments of unified hardware and software two-level memory schemes and associated methods, system and software are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, INTEL® Corporation introduced new rack architecture called Rack Scale Design (RSD) (formerly called Rack Scale Architecture). Rack Scale Design is a logical architecture that disaggregates compute, storage, and network resources and introduces the ability to pool these resources for more efficient utilization of assets. It simplifies resource management and provides the ability to dynamically compose resources based on workload-specific demands.

RSD uses compute, fabric, storage, and management modules that work together to enable selectable configuration of a wide range of virtual systems. The design uses four basic pillars, which can be configured based on the user needs. These include 1) a Pod Manager (PODM) for multi-rack management, comprising firmware and software Application Program Interfaces (APIs) that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 2:
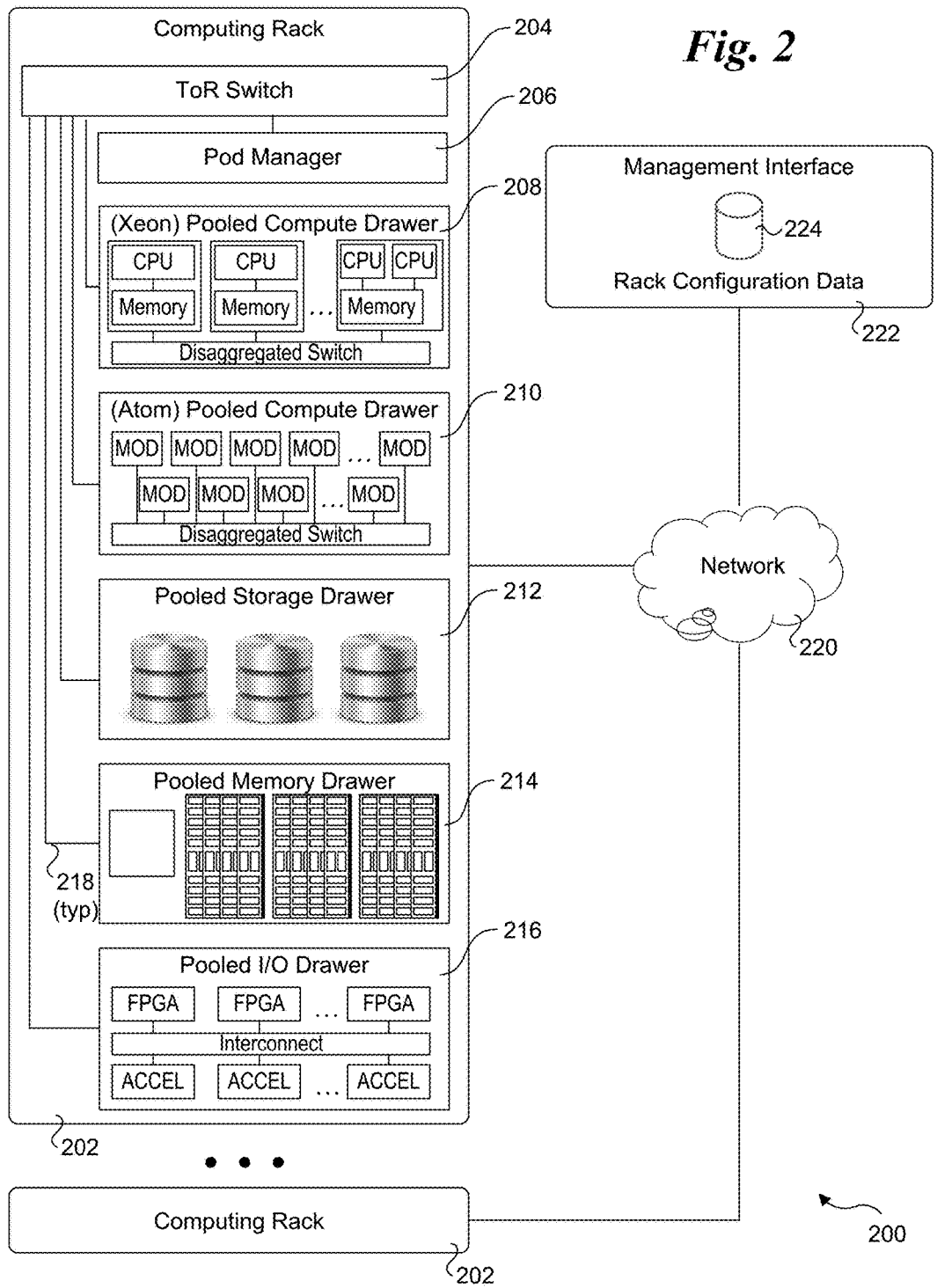
FIG. 2 is a schematic diagram of a Rack Scale Design (RSD) configuration in a data center, according to one embodiment.

An exemplary RSD environment 200 is illustrated in FIG. 2. RSD environment 200 includes multiple computing racks 202, each including a Top of Rack (ToR) switch 204, a pod manager 206, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an INTEL® XEON® pooled computer drawer 208, and INTEL® ATOM® pooled compute drawer 210, a pooled storage drawer 212, a pooled memory drawer 214, and an pooled I/O drawer 216. Each of the pooled system drawers is connected to ToR switch 204 via a high-speed link 218, such as a 40 Gigabit/second (Gb/s) or 100 Gb/s Ethernet link or an 100+ Gb/s Silicon Photonics (SiPh) optical link. In one embodiment high-speed link 218 comprises an 800 Gb/s SiPh optical link.

Multiple of the computing racks 200 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

RSD environment 200 further includes a management interface 222 that is used to manage various aspects of the RSD environment. This includes managing rack configuration, with corresponding parameters stored as rack configuration data 224.

Figure 3:
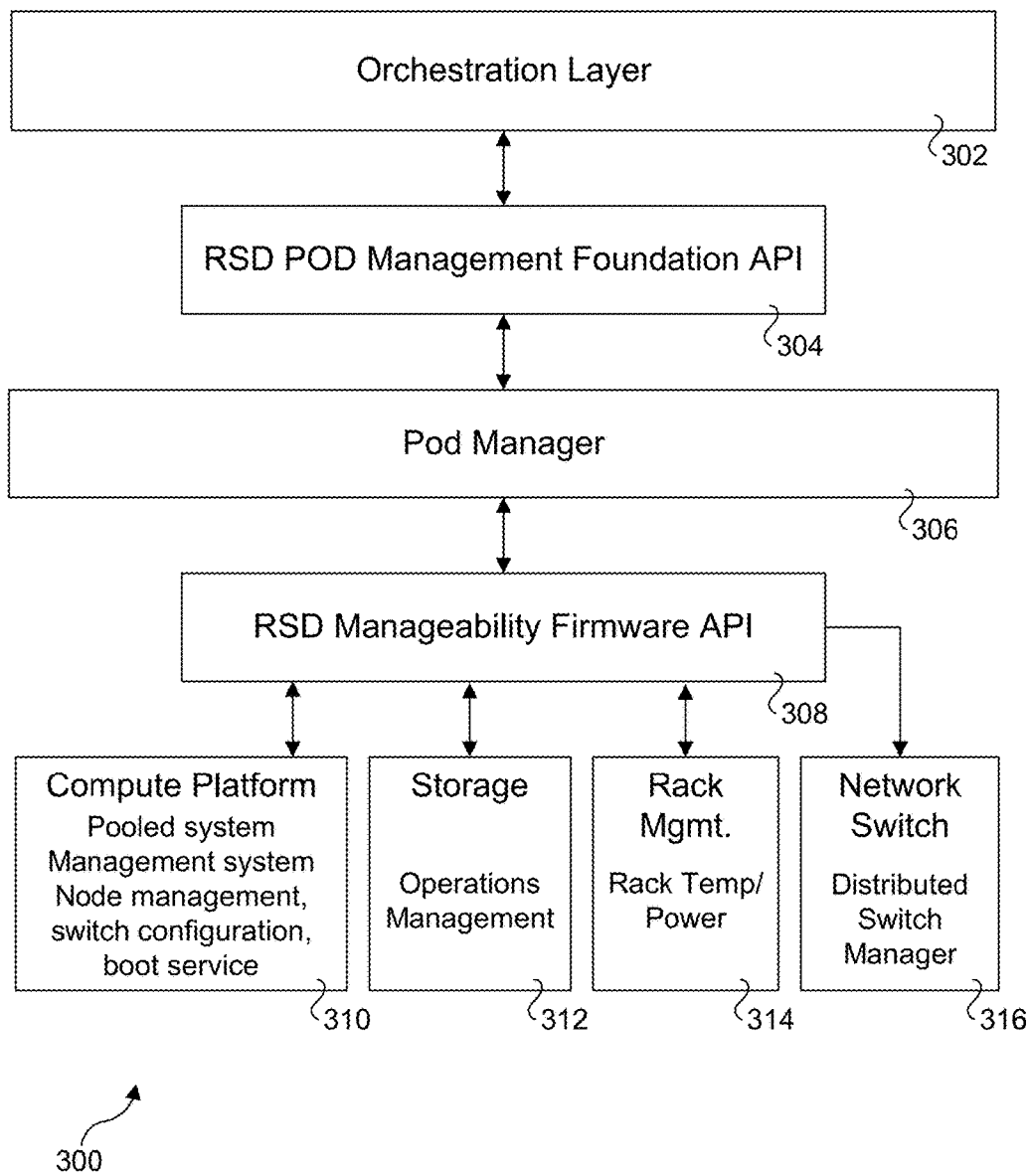
FIG. 3 is a block diagram of an RSD management architecture, according to one embodiment

FIG. 3 shows one embodiment of an RSD management architecture 300. The RSD management architecture includes multiple software and firmware components configured in a layered architecture including an orchestration layer 302, an RSD pod management foundation API (Application Program Interface), a pod manager 306, and an RSD manageability firmware API 308. The bottom layer of RSD management architecture includes a compute platform management component 310, a storage management component 312, a rack management components 314, and a network switch management component 316.

The compute platform management component 310 performs operations associated with compute drawers and includes a pooled system, a management system, node management, switch configuration, and boot service. Storage management component 312 is configured to support operation management of pooled storage drawers. Rack management component 314 is configured to manage rack temperature and power sub-systems. Network switch management component includes a distributed switch manager.

INTEL® Rack Scale Design is designed to change the focus of platform architecture from single servers to converged infrastructure consisting of compute, network and storage, as discussed above and illustrated in FIG. 2. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSD terminology) manager called a Pooled System Management Engine (PSME). The management elements of RSD, RMM and PSMEs are connected to a private network that is not accessible external to the rack, as shown in FIG. 4 and discussed below.

Figure 4:
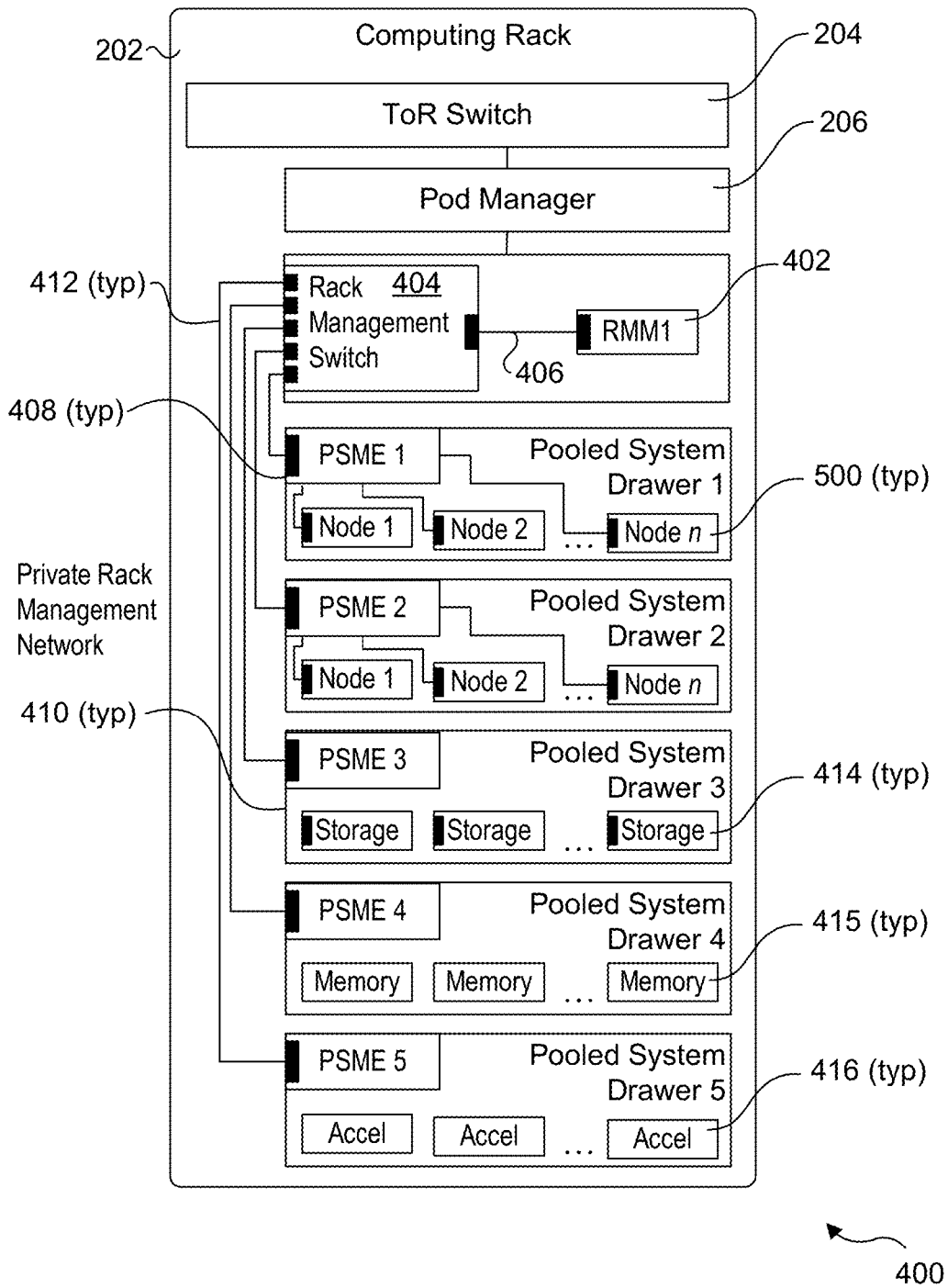
FIG. 4 is a schematic diagram showing further details of an RSD rack implementing Pooled System Management Engines (PSMEs)

FIG. 4 shows one embodiment of a rack configuration 400 employing rack management and configuration components that communicate over a private rack management network. The rack management and configuration components include an RMM 402 coupled in communication with a rack management switch 404 via a link 406. A respective PSME 408 is associated with each of five pooled system drawers 410. Each PSME 408 is connected to rack management switch 404 via a link 412. The rack management switch is also connected to POD Manager 206. In the illustrated embodiment, each of pooled system drawers 1 and 2 includes a plurality of compute nodes 500, while pooled system drawers 3, 4, and 5 respective include a plurality of storage resources 414, a plurality of memory resources 415, and a plurality of IO accelerator resources 416.

In a datacenter environment such as RSD, the data center management software is able to compose various rack resources into a compute instance(s) or compute node that meets user performance requirements. In general, over allocation of resources to meet the performance results in inefficient utilization of the rack resource, leading to higher total cost of ownership (TCO) and lower return on investment (ROI).

Current enterprise/cloud computer systems have volatile memory, for example DRAM (Dynamic Random Access Memory) memory, and storage class non-volatile memory such as 3D crosspoint (3D XPOINT™) technology DIMMs (Dual In-line Memory Modules), which are populated locally within the compute node. Other types of memory may also be used.

Non-volatile memory is a storage medium that does not require power to maintain the state of data stored by the medium. Non-limiting examples of nonvolatile memory may include any or a combination of: solid state memory (such as planar or 3D NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistorless stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of storage devices that implement such standards may be referred to as DDR-based interfaces.

Figure 5:
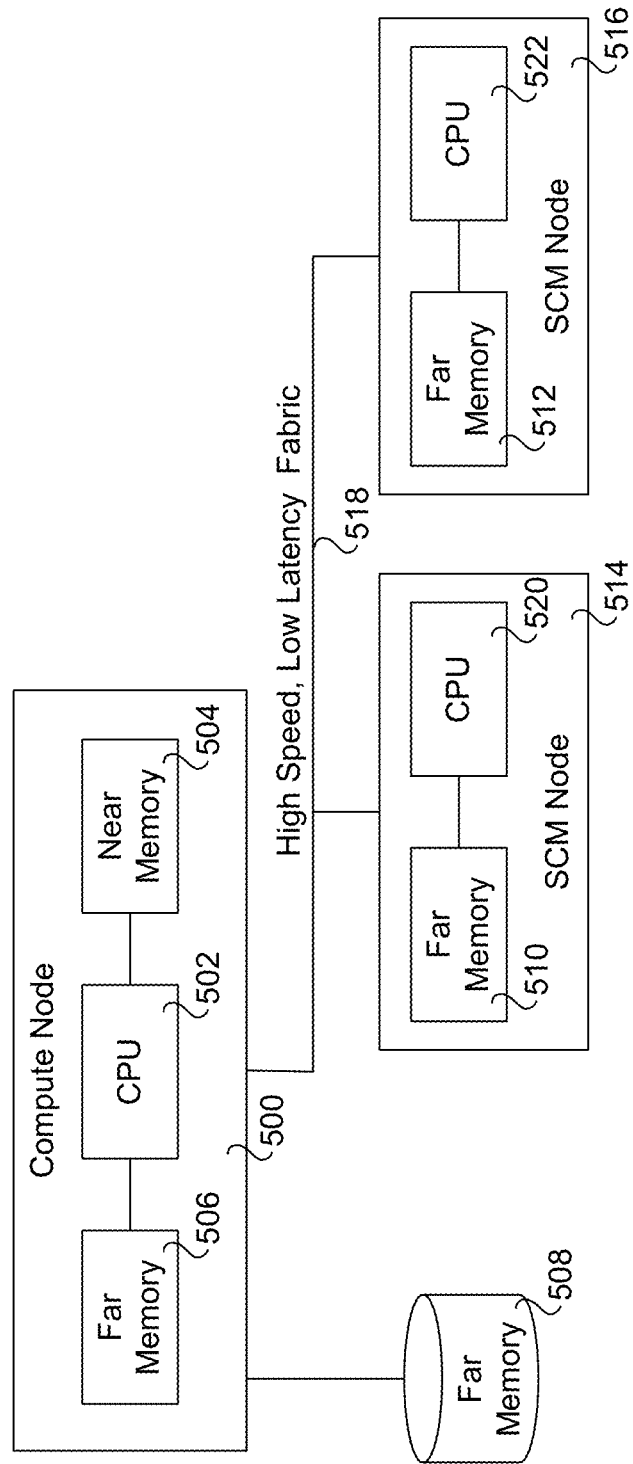
FIG. 5 is a schematic diagram illustrating an overview of a unified software and hardware two-level memory scheme, according to one embodiment.

In accordance with aspects of embodiments disclosed herein, a unified software and hardware two-level memory scheme is disclosed that combines the user of "near" and "far" memory in a manner that is transparent to application software running on a compute node. In abstract overview of this concept is shown in FIG. 5. A compute node 500 is shown including a central processing unit (CPU) 502 coupled to near memory 504 and far memory 506. Compute node 500 is further shown connected to far memory 508 implement in a block-based storage, and far memory 510 and 512 in storage-class memory (SCM) memory nodes 514 and 516 which are coupled to compute node 500 via a high speed, low latency fabric 518. In the illustrated embodiment, far memory 510 is coupled to a CPU 520 in SCM node 514 and far memory 512 is coupled to a CPU 522 in SCM node 516. Further details of the operation of SCM nodes are described below.

Figure 6:
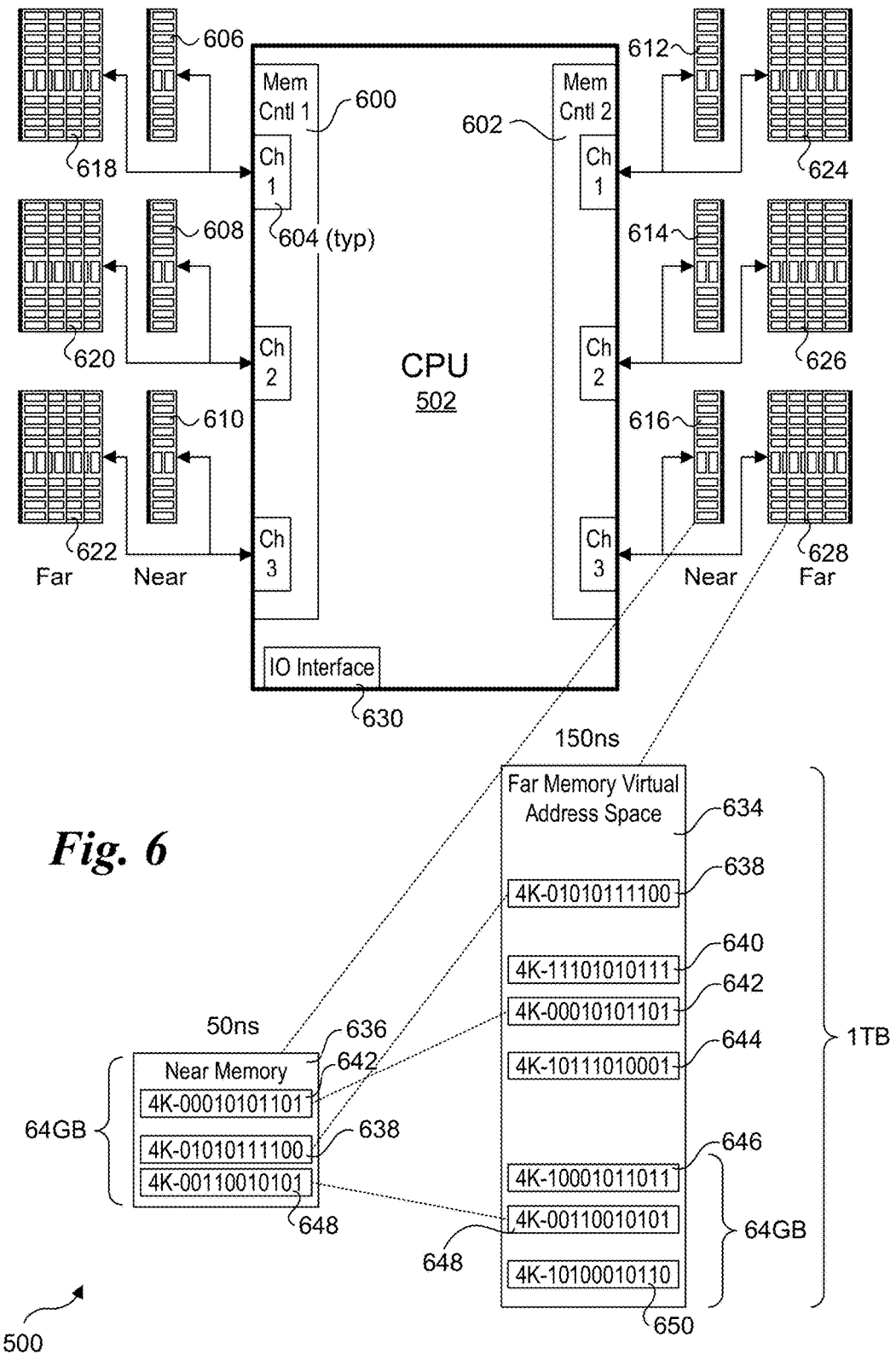
FIG. 6 is a schematic diagram illustrating one embodiment of a compute node including both near memory and far memory that is accessed via multiple memory channels.

FIG. 6 show further details of one embodiment of compute node 500. CPU 502 includes a pair of memory controller 600 and 602, each including three memory channels 604 (also labeled Ch(annel) 1, Ch 2, and Ch 3). Each of the memory channels 604 is coupled to a respective pair of memory devices, including a near memory device (memory devices 606, 608, 610, 612, 614, and 616) and a far memory device (memory devices 618, 620, 622, 624, 626, and 628). CPU 502 further includes one or more input-output (IO) interfaces 630.

The terminology "near" and "far" memory do not refer to the physical distance between a CPU and the associated memory device, but rather the latency and/or bandwidth for accessing data stored in the memory device. In general, near memory devices have a lower latency and/or higher bandwidth than far memory devices. In one embodiment, near memory devices use volatile memory, such as DDR4 or DDR5 DRAM. In alternative embodiments, far memory may use either volatile memory or (preferably) non-volatile memory. In one embodiment, near memory devices 606, 608, 610, 612, 614, and 616 are DDR4 or DDR5 DIMMs. In one embodiment, far memory devices are 3D crosspoint technology DIMMS.

Generally, the size of the far memory devices are larger than the near memory devices. For illustrative purposes, the far memory devices 618, 620, 622, 624, 626, and 628 are depicted as multiple DIMMs, while near memory devices 606, 608, 610, 612, 614, and 616 are depicted as single DIMMs. In an actual implementation, there may be one or more near memory device DIMMs connected to the same memory channel, and one or more far memory devices. Generally, a CPU or similar device (e.g., a processor, including processors with System on a CHIP (SoC) architectures) may include one or more memory controllers, each having one or more memory channels. As such, the use of two memory controllers, each with three memory channels is merely exemplary and non-limiting.

The lower portion of FIG. 6 shows a far memory virtual address space 634 associated with far memory device(s) 628, and a near memory virtual address space 636 associated with near memory device 616. In the illustrated embodiment, near memory virtual address space 636 has a size of 64 GB (GigaBytes), while far memory virtual address space 634 has a size of 1 TB (TeraByte); however, these are merely exemplary sizes, as other size may also be used in a similar manner to that disclosed herein.

In accordance with one aspect, the virtual address spaces of near and far memory are accessed in a somewhat similar manner to a memory cache architecture, except that rather than accessing processor caches, near and far memory devices are accessed. As is well-known, nearer (to a processor core) caches are usually faster and smaller than farther caches; a similar situation exists in the architecture of FIG. 6. As illustrated in FIG. 6, the near memory devices, including near memory device 616 have an access latency of 50 nanoseconds (ns), while the far memory devices, including far memory device 628, have an access latency of 150 ns.

In the embodiments herein, data is stored in the memory and storage devices in "data units" that have physical and/or virtual addresses. For example, non-limiting examples of data units include cachelines, memory pages, and storage blocks. To access a data unit, a memory access request is issued by an operating system specifying the virtual address corresponding to the physical location of the data unit in the memory and storage devices. For memory access requests, logic in the host processor (and/or operating system) is used to map the virtual memory address in the request to the physical address of the corresponding data unit. During the actually memory access, the data unit at that physical address is accessed.

In one embodiment, the system detects that there is 1064 GB of memory attached to channel 3 of memory controller 602 (1 TB far memory and 64 GB near memory). Meanwhile, the system exposes only the 1 TB of virtual address space (far memory virtual address space 634) to the operating system. In addition, the operating system is agnostic to the existence of the 64 GB of near memory. During operation, memory access patterns are observed and portions of virtual memory that is frequently accessed or has been allocated to a compute node having a prioritized service level agreement are copied from far memory devices to near memory devices. In connection with this, corresponding data unit mapping information is maintained to identify what data units are contained in near memory, and which data units are contained in far memory.

FIG. 6 depicts exemplary data units in far memory virtual address space 634 comprising 4K (Kilobyte) memory pages 638, 640, 642, 644, 646, 648, and 650. In addition, copies of memory pages 638, 642, and 648 are present in near memory virtual address space 636. As explained in further detail below, during ongoing memory access operations, the data in various data units are copied from far memory virtual address space into near memory virtual address space using a data unit caching policy and/or algorithm. This is somewhat analogous to a cacheline replacement policy under a processor cache hierarchy, except that it is only implemented for some memory accesses and not others. In addition, unlike a cache hierarchy, under the embodiments herein memory can be accessed directly from both near and far memory devices.

As shown in FIG. 5 and discussed above, far memory may include storage-class memory in an SCM node that is accessed via a high-speed, low latency fabric. SCM combines the benefits of a solid-state memory, such as high performance and robustness, with the archival capabilities and low cost of conventional hard-disk magnetic storage. SCM is a new hybrid storage/memory tier with unique characteristics. It's not exactly memory, and it's not exactly storage. Physically, it connects to memory slots in a motherboard, like traditional DRAM. While SCM is slightly slower than DRAM, it is persistent, meaning that, like traditional storage, its content is preserved during a power cycle. Compared to flash, SCM is orders of magnitude faster, providing performance gains on both read and write operations. It has another benefit over flash as well—SCM tiers are significantly more resilient, not suffering from the wear that flash falls victim to.

Generally, SCM can be addressed at either the byte or block level, depending on the particular implementation. This gives operating systems, software and hypervisor developers significant flexibility regarding the medium's applications. For example, it's conceivable that operating systems will initially treat SCM as block storage devices formatted by file systems and databases for compatibility purposes. However, next-generation applications may choose to access SCM directly via memory-mapped files using byte-level addressing. Hypervisors can abstract and present isolated SCM regions directly to different VMs as either execution memory or a flash-like storage resource.

The Rack Scale Design system uses these compute nodes and storage nodes (Non-volatile memory, SATA and NVM Express (NMVe) storage devices, etc.) to compose a system based on user needs. Here if a user wants a certain amount of storage class memory, the POD Manager scans all the compute nodes in the rack and selects a best fit compute node that contains the user requested storage class memory and provides it to the user. Under this approach, compute nodes may be composed to include memory resources that are in separate (from the compute nodes' CPUs) pooled system drawers. For example, a system can be composed that combines both local memory resources within a compute drawer with remote memory resources housed in a separate memory pooled system drawer. Moreover, the system can be implemented in a manner under which the combined memory resources appear as local resources to software running on the local compute node.

Figure 7:
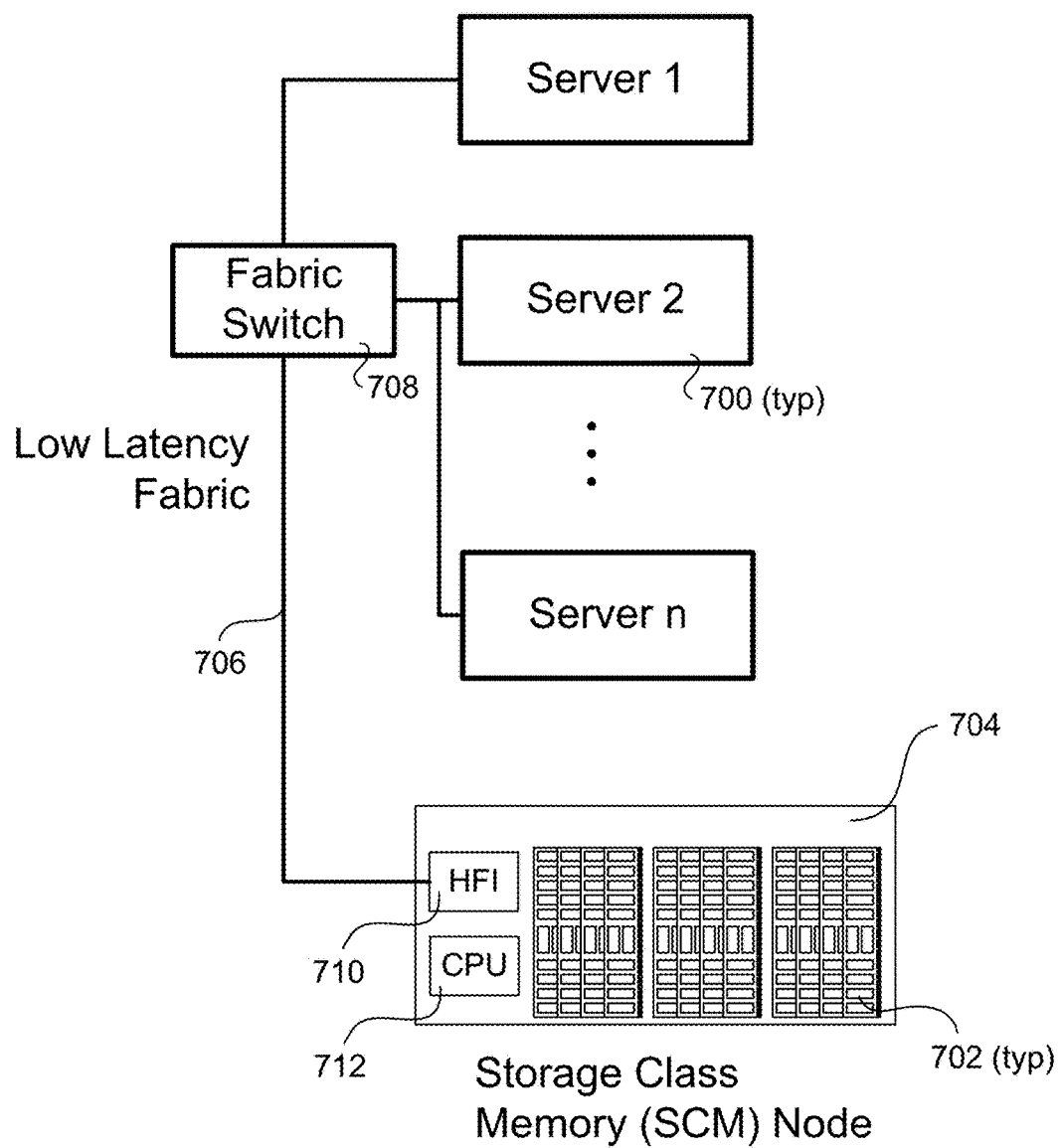
FIG. 7 is a schematic diagram illustrating an overview of a storage class memory (SCM) architecture under which SCM is accessed over a low-latency fabric.

An overview of the concept is illustrated in FIG. 7. Under the mechanism, each of a plurality of compute nodes, such as servers 700, is enabled to access memory 702 in an SCM node 704 via a low latency fabric 706 and a fabric switch 708. In one embodiment, the low latency fabric comprises an INTEL® Omni-Path fabric, which employs the INTEL® Omni-Path Architecture (OPA). OPA employs a host fabric interface (HFI) at each fabric endpoint. SCM node 704 is an example of an OPA endpoint and includes an HFI 710. A processor 712 is also used by SCM node 704 to facilitate access to memory 702 via execution of instructions stored on the SCM node. SCM node 704 contains storage class memory devices, such as 3D XPOINT™ technology DIMMs, which are used as disaggregated storage class memory. Other types of non-volatile memory devices may also be used, as well as volatile DRAM-based DIMMS, such as DDR4 (double data rate fourth generation) and future DDR5 (fifth generation) DIMMs or in combinations or other type of byte accessible memory DIMMs. Generally, an SCM node may comprise a pooled system memory drawer, or multiple SCM nodes may be installed in a pooled system memory drawer.

Figure 8:
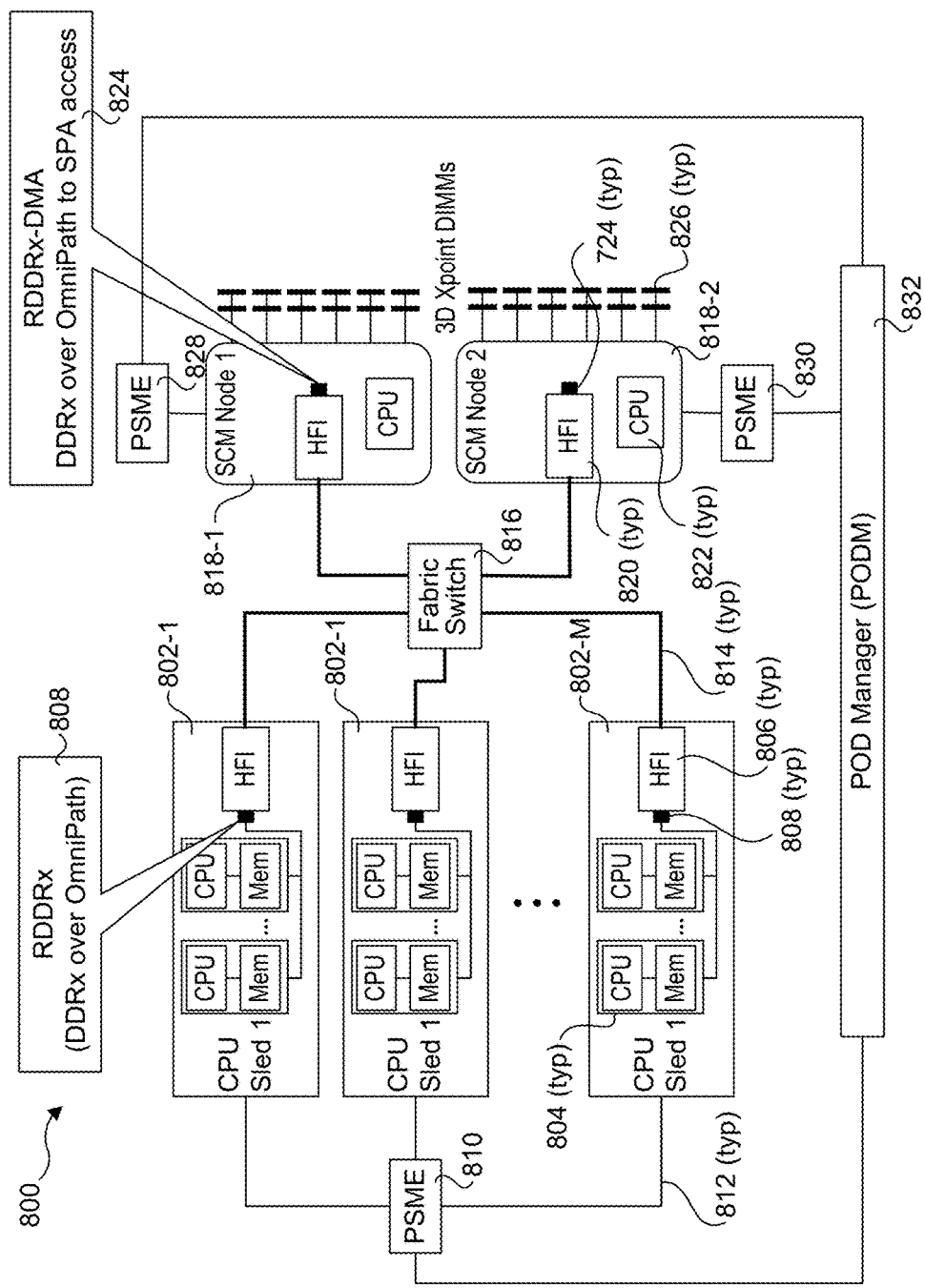
FIG. 8 is a schematic diagram illustrating further details of one embodiment of an SCM architecture employing a disaggregated memory architecture.

An exemplary disaggregated SCM memory architecture 800 corresponding to one embodiment of an implementation under an RSD environment is shown in FIG. 8. SCM memory architecture 800 includes a plurality of CPU sleds 802-1-802-M, also labeled Sled 1-Sled M. Each CPU sled 802 includes one or more compute nodes 804 including one or more CPUs and memory that is coupled to an HFI 806 via a Remote DDR-based (referred to herein as RDDRx) engine 808. As used herein, "DDRx" refers to any existing and future DDR-based memory interface and/or protocol defined by a current or future DDR standard or otherwise using DDR-based technology, whether standardized or not, including Joint Electron Device Engineering Council (JEDEC) DDR-based standards. Each CPU sled 802 is connected to a PSME 810 via a high speed link 812, such as a high speed Ethernet link or SiPh optical link.

Each of HFIs 806 is connected to an OPA fabric including a plurality of fabric links 814 and a fabric switch 816. The OPA fabric facilitates high-speed, low-latency communication between compute nodes 804 and a pair of SCM nodes 818-1 and 818-2. Each of SCM nodes 818-1 and 818-2 includes an HFI 820, a CPU 822, and RDDRx-DMA (Direct Memory Access) engine 824, and a plurality of 3D XPOINT™ technology DIMMs 826. Each of SCM nodes 818-1 and 818-2 is also connection to a respective PSME 828 and 830. Each of PSMEs 810, 828 and 830 is connected to a POD Manager (PODM) 832. In addition to using 3D XPOINT™ technology DIMMs 826, other types of memory devices using various types of protocols may also be used, including DRAM-based devices, NVMe (Non-volatile Memory Express protocol) devices, or other type of byte accessible memory devices, or a combination of such memory devices.

CPU 822 is representative of various types of processing elements, including processors, microcontrollers, etc., and the term "CPU" does not limit this component to a central processor unit. CPU 822 is used for initializing memory using normal memory reference code. As a result, the SCM nodes shown herein could employ a microcontroller any other component capable of initializing the memory.

Figure 9A:
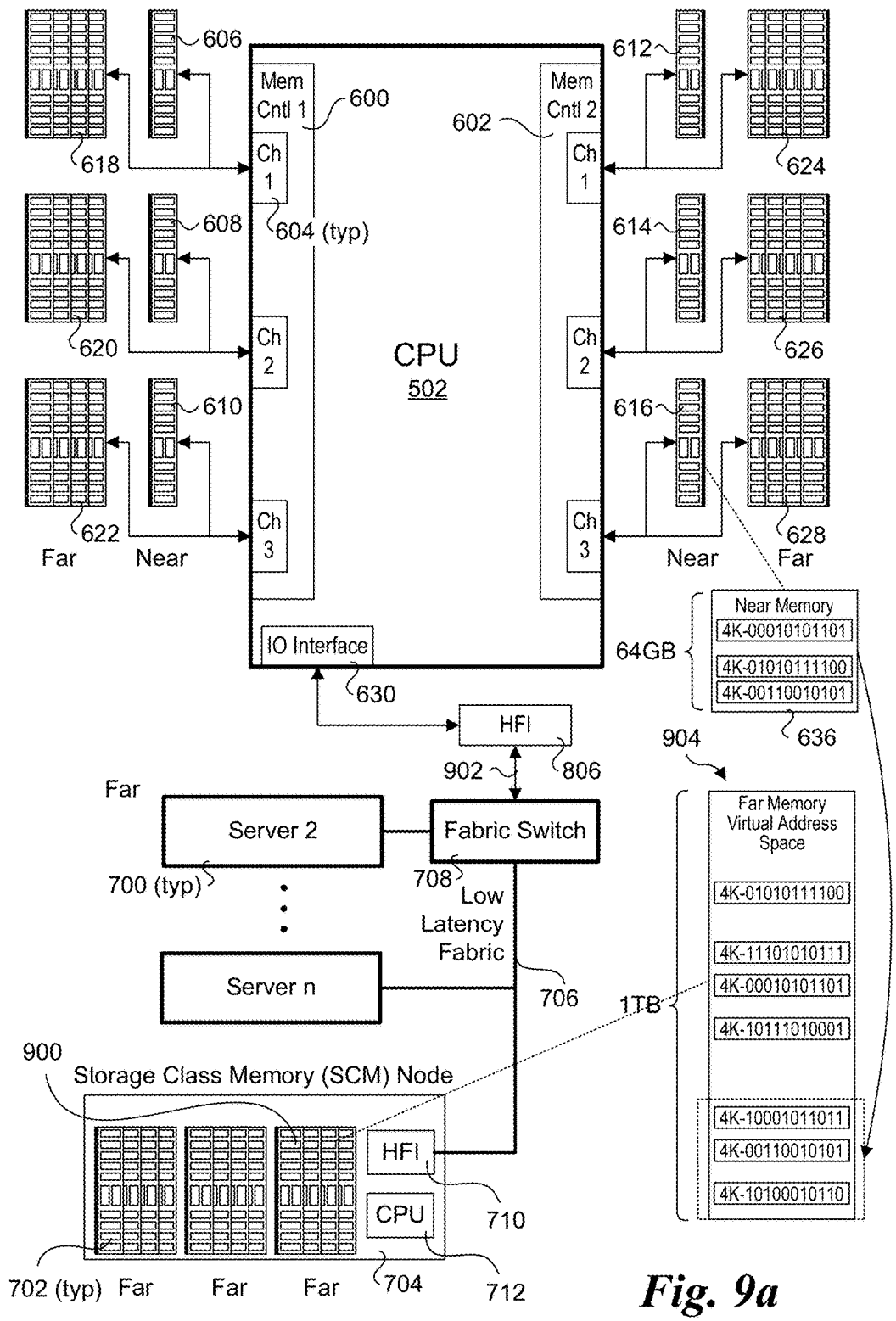
FIG. 9a is a diagram illustrating one embodiment two-level memory access scheme under which near memory is accessed locally, and far memory includes both local memory device and SCM accessed over a low latency fabric.

FIG. 9a shows further details illustrating the use of far memory that is located on an SCM node, according to one embodiment. In this example, a compute node including CPU 502 has been composed to include 1 TB of far memory 900 on SCM node 704. In the illustrated embodiment, IO interface 630 of CPU 502 is coupled to an HFI 806, which in turn is connected to fabric switch 708 via a fabric link 902. In one embodiment, far memory 900 supports the NVMe protocol and is implemented using an NVMe over Fabric (NVMe-oF) protocol. Far memory 900 may also be implemented using other types of non-volatile memory devices and protocols.

The lower right-hand side of FIG. 9a shows a far memory virtual address space 904 associated with far memory 900, and near memory virtual address space 636 which is associated with near memory device 616, as before. The embodiment of FIG. 9a under which far memory is accessed over a fabric shares some fundamental aspects with the embodiment of FIG. 6 with respect to how data units are accessed. For example, the system detects there is 64 GB of near memory and 1 TB of far memory while only exposing a 1 TB virtual memory address space to the platform software. However, since near memory is accessed via the CPU's memory controller and the far memory is accessed via a fabric, the access mechanisms are different and the latency for accessing the far memory is increased.

Figure 9B:
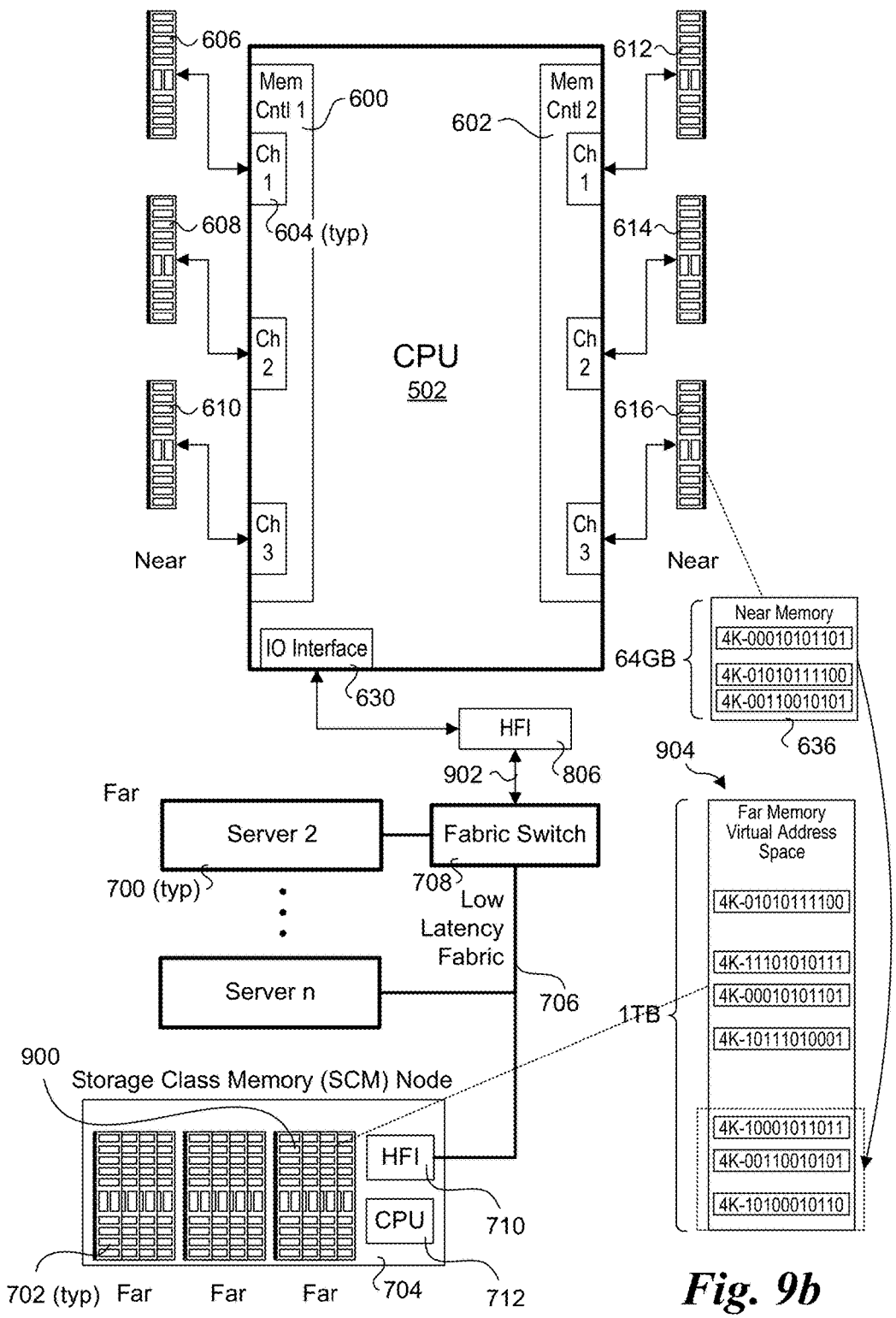
FIG. 9b is a diagram illustrating an augmentation to the architecture of FIG. 9a under which the local far memory has been removed.

FIG. 9b shows a configuration that is similar to that shown in FIG. 9a, except now there are no far memory devices connected to the memory channels 604 in memory controller 600 and 602. More generally, under the approach illustrated in FIG. 9b there would be one or more near memory devices, such as DDR4/5 DIMMs, connected to the CPU and one or more far memory devices accessed over a fabric.

Figure 9C:
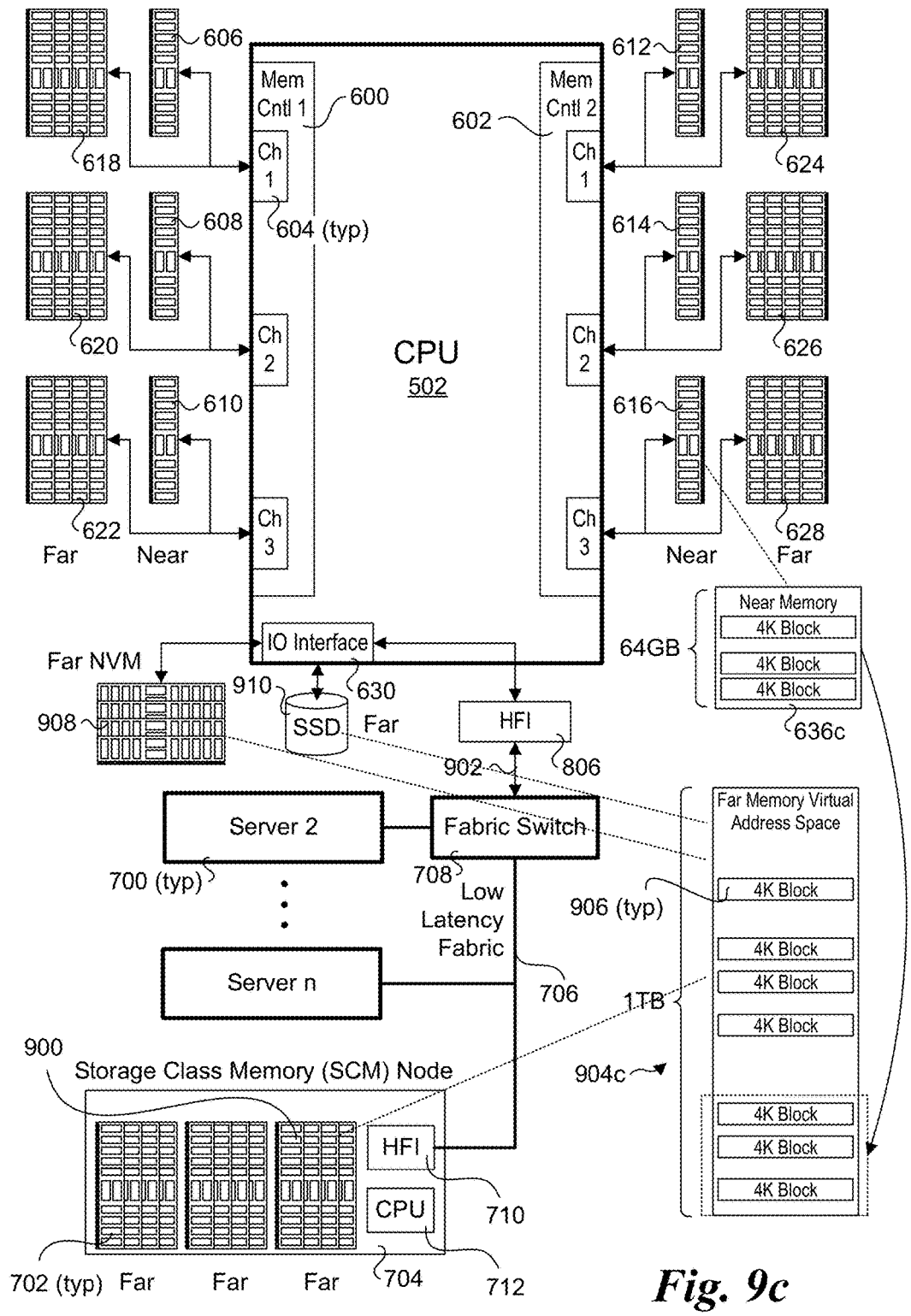
FIG. 9c is a diagram illustrating one embodiment two-level memory access scheme under which near memory is accessed locally, and far memory comprises a block storage device accessed over an IO interface using block storage access.

In addition to managing access to memory via memory pages, access to memory in a near memory and far memory implementation may employ a block access mechanism, such as access to storage blocks. One example of this is illustrated in FIG. 9c, wherein the virtual memory addresses spaces 636c and 904c are depicted as employing 4K blocks 906. As further shown in FIG. 9c, a non-volatile far memory device 908 and a solid-state disk (SSD) 910 implemented as a far memory device are connected to IO interface 630. The address spaces of each of these far memory devices employs storage blocks, such as 4K blocks 906. It shall be recognized that in an actual implementation, each of far memory devices 900, 908, and 910 would have a separate virtual memory address space, rather than the single virtual memory address space 906c shown in FIG. 9c.

Near-Far Memory Allocation and Management based on SLA Levels

According to another aspect of some embodiments, near and far memory is allocated and managed based on service level agreement (SLA) levels. For example, users of hosted PAAS (Platform as a Service) or IAAS (Infrastructure as a Service) often have a service level agreement under which the host of the service guarantees certain levels of service as related to corresponding parameters that can be measured or otherwise quantified on some level. In one embodiment, an SLA includes a priority level used to prioritize the utilization of near memory.

Figure 10:
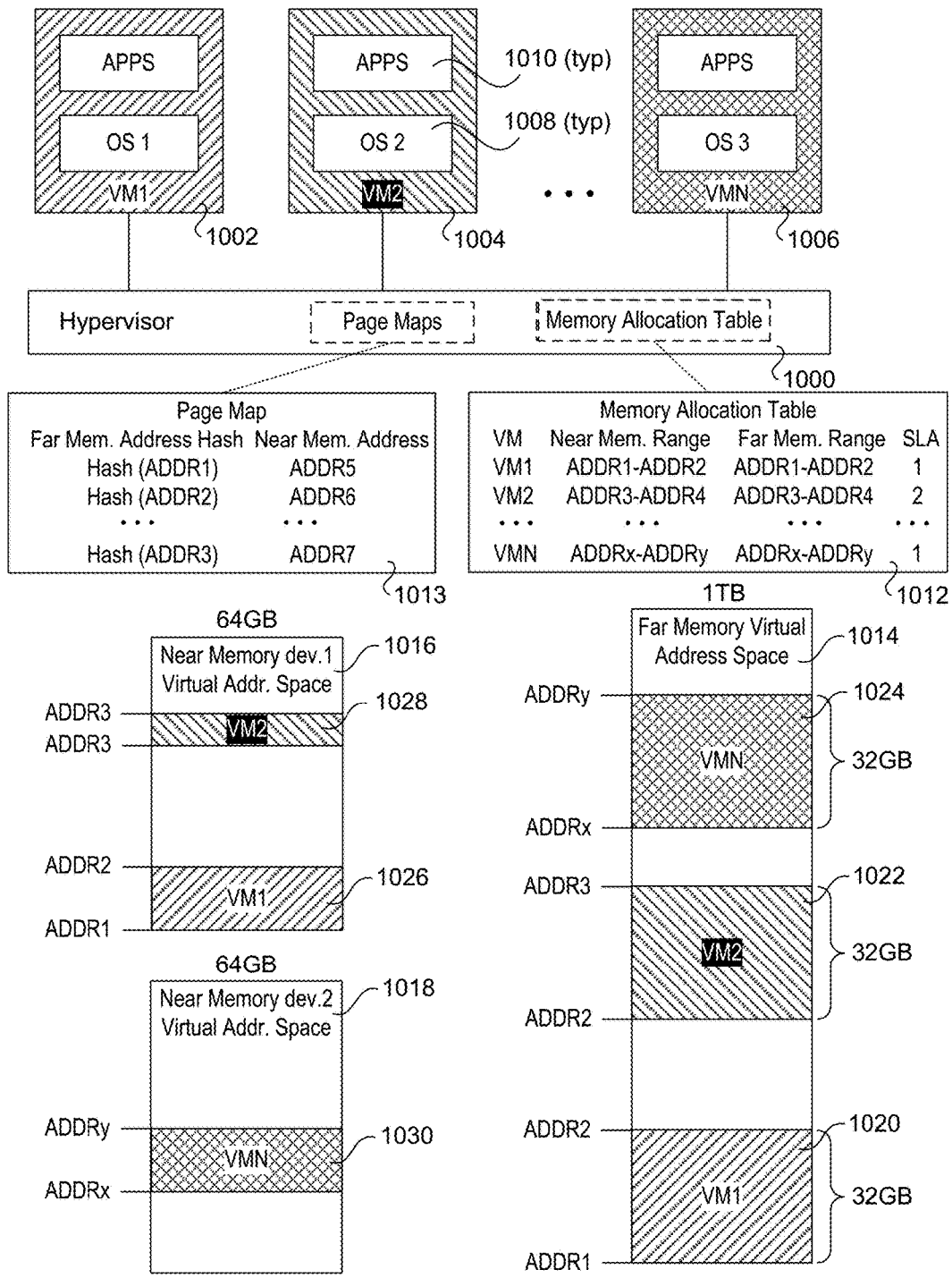
FIG. 10 is a diagram illustrating aspects of one embodiment of two-level memory access scheme using a memory allocation table and one or more page maps.

An example of an implementation of near and far memory allocation and management with SLA priority levels is illustrated in FIG. 10. In accordance with one aspect, the near and far memory allocation and management is handled, at least in part, by a hypervisor 1000. As is well-known in virtualized environments such as used for PAAS and IAAS services and the like, a hypervisor implements an abstraction layer that virtualizes the physical hardware resources, such as processor cores, memory, storage, and IO resources, enabling virtualized resources to be allocated to virtual machines (VMs) that run on a compute platform, as depicted by VMs 1002, 1004, and 1006 (also labeled and referred to as VM1, VM2 . . . VMN). Generally, hypervisor 1000 in FIG. 10 is illustrative of both Type1 and Type2 hypervisors. Similar components may be implemented for a container-based architecture. As further depicted, an operating system (OS) 1008 (also depicted as OS 1, OS 2, and OSN) is run on each of VM1, VM2, and VMN, and one or more applications 1010 are run on each OS. From the perspective of each OS, it is using local physical memory resources, and is unaware of the abstraction layer implemented by the hypervisor.

In reality, the memory resources that are allocated to the VMs (and thus used by each OS) is a combination of near and far memory resources, with utilization mappings maintained in a memory allocation table 1012 and page maps 1013. Hypervisor 1000 will allocate each of VM1, VM2, and VMN a respective portion of the virtual address space in a far memory virtual address space 1014. These address spaces are defined by corresponding address ranges maintained in memory allocation table 1012. Similarly, each of VM1, VM2, and VMN will be allocated a portion of near memory address space. In this example, there are two near memory address spaces 1016 and 1018 corresponding to respective near memory devices 1 and 2.

As further illustrated, each of VM1, VM2, and VMN is allocated a respective portion 1020, 1022, and 1024 of far memory virtual address space 1014. Similarly, each of VM1, VM2, and VMN is allocated a respective portion of the near memory virtual address space spanning from among near memory virtual address spaces 1016 and 1018, as depicted by virtual address space portions 1026, 1028, and 1030. Corresponding entries (rows) identifying the virtual address ranges for the portions of near and far memory virtual address spaces allocated to each VM are maintained in memory allocation table 1012. As further shown, memory allocation table 1012 also includes an SLA column used to identify the SLA assigned to a given VM. In this exemplary allocation, VM1 and VMN have been assigned an SLA of 1, while VM2 has been assigned in SLA of 2. In this example, SLA 1 has a higher priority than SLA 2; accordingly, the size of the portions 1026 and 1030 of near memory virtual address space allocated to VM1 and VMN is larger than portion 1028 allocated to VM2.

A page map 1013 includes entries that identify copies of far memory data units (memory pages) that are currently stored on near memory devices and their addresses in the near memory virtual address space. Generally, such maps use hashing functions or the like, and are sometimes called hash tables or hash maps. Under an exemplary hash table scheme, a lookup column stores hashes of the addresses of far memory pages that are stored in the near memory address space, while a second column identifies the near memory virtual address at which that copy of the far memory page is stored. Other types of mapping tables may be used, as well as other types of hashing schemes, including Cuckoo hashing schemes, which are known to those skilled in the art. In one embodiment, there is a single page map used for all of the VMs. In another embodiment, separate page maps are maintained for each VM.

Figure 11:
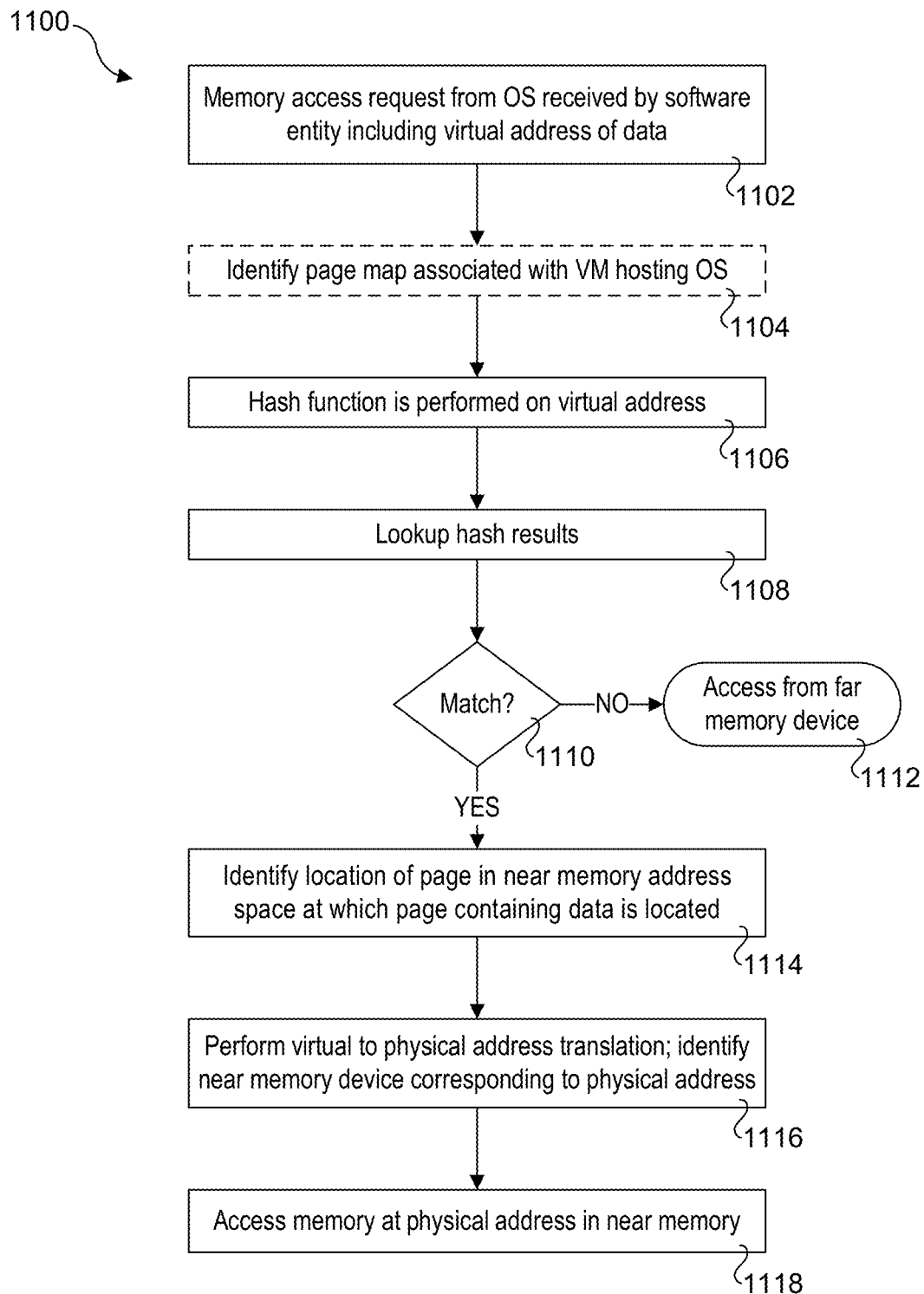
FIG. 11 is a flowchart illustrating operations and logic for implementing a page map, according to one embodiment.

With reference to flowchart 1100 of FIG. 11, in one embodiment, a page map is implemented as follows. First, in a block 1102, a memory access request including a virtual address identifying the starting location at which the data is located in the virtual memory space used by the operating system is received by a software entity. In the embodiment of FIG. 10, the software entity is hypervisor 1000, and the memory access request is received from one of operating systems 1008. If a separate page map is used for each VM, the hypervisor will identify which page map is used in an optional block 1104 based on the VM hosting the operating system.

In a block 1106, a hash function is performed on the virtual address, with the result used as a lookup into the page map, as depicted in a block 1108. As depicted by a decision block 1110, if there is a match (i.e., the hash result matches one of the hashed entries in the page map) the logic proceeds to a block 1114 to identify the location of the memory page in the near memory address space containing the data. As illustrated in page map 1013 of FIG. 10, each hash entry (entries in the first column) has an associated address in the second column corresponding to the address of the (copy of the) far memory page in the near memory virtual address space.

Next, in a block 1116, a virtual to physical address translation is performed. While operating systems generally use a paging scheme, data is stored in memory devices using cacheline addressing. Generally, the virtual to physical address translation may be performed by the hypervisor or the memory controller, or using the combination of the hypervisor and memory controller. The virtual to physical address translation will identify both the near memory device storing the data, as well as the location (cacheline(s)) in that near memory device at which the data are stored. In a block 1118, the physical address in the near memory device is used to access the data. Those skilled in the art will recognize the operations of blocks 1116 and 1118 as conventional operations performed to access memory devices that are coupled to a memory controller.

As shown in a block 1112, if the hash lookup results in a miss (i.e., no matching value exists), the data is not located in a near memory device, and thus the logic proceeds to access the data from a far memory device. This will likewise generally include operations similar to those shown in blocks 1116 and 1118, which will identify the far memory device on which the data is stored, as well as the physical address corresponding to the location of the data on the far memory device.

Figure 12:
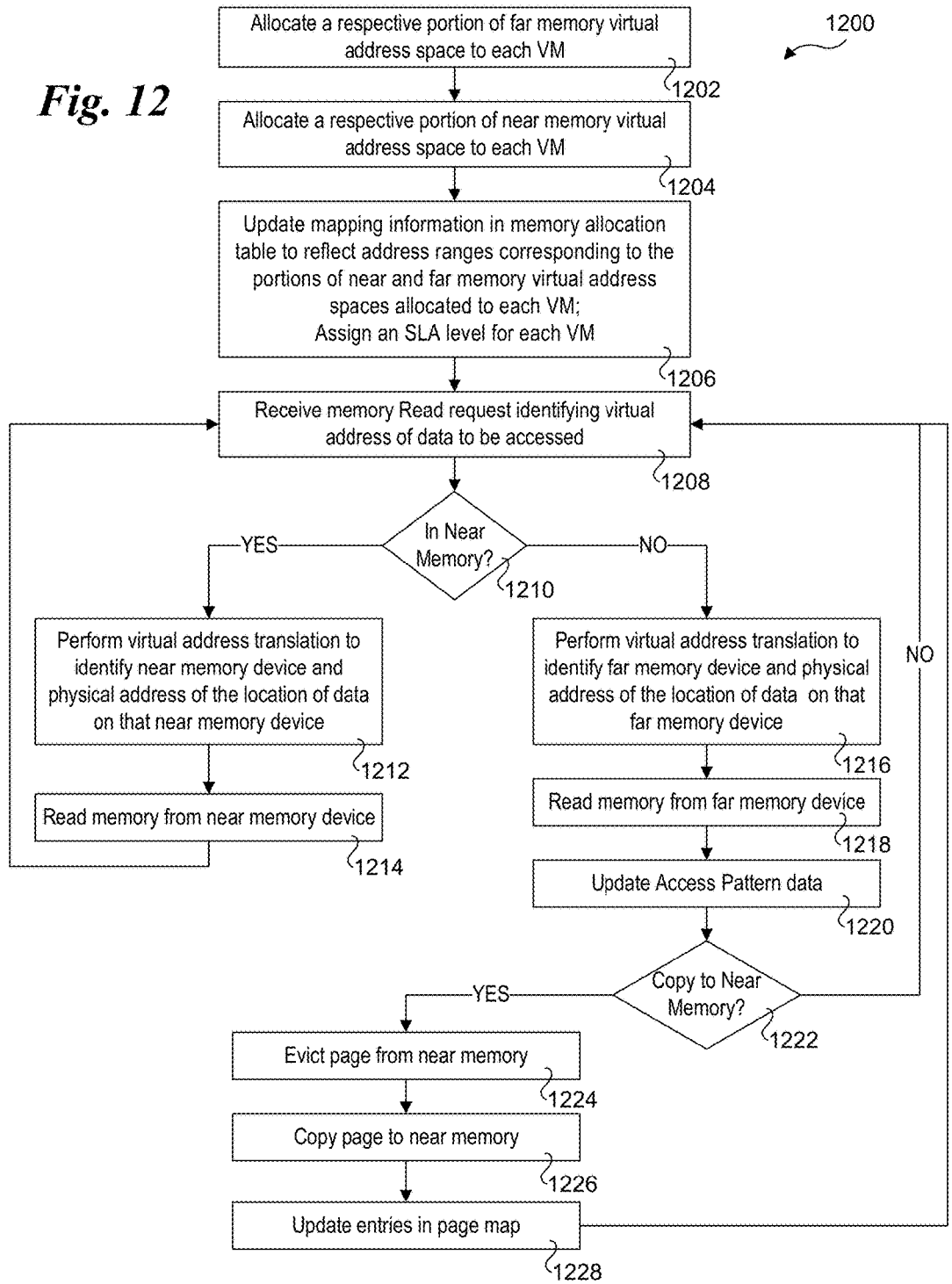
FIG. 12 is a flowchart illustrating operations and logic performed during configuration of a two-level memory access mechanisms and handling ongoing memory read requests, according to one embodiment.

FIG. 12 shows a flowchart illustrating operations and logic performed during configuration of a two-level memory access mechanisms and handling ongoing memory read requests, according to one embodiment. In a block 102 a respective portion of the far memory virtual address space is allocated to each VM. In a block 1204, a respective portion of the near memory address space is also allocated to each VM. In a block 1206 the mapping information in the memory allocation table is updated to reflect the address ranges corresponding to the portions of the near and far memory virtual address spaces allocated to each VM. For implementations supporting service level agreements, an SLA level is assigned for each VM.

The remaining operations and logic depicted from a block 1208 downward are performed in an ongoing manner after the configuration operations in blocks 1202, 1204, and 1206 have been completed. In block 1208 a memory read request is received identifying the virtual address of the data to be accessed to service the request. In a block 1210 a determination is made to whether the data is located in near memory. If the answer is YES, the logic proceeds to a block 1212 in which a virtual to physical address translation is performed, identifying the near memory device storing the data and the physical address corresponding to the location of the data on that near memory device. The data is then read from the near memory device in a block 1214. In one embodiment, the operations of blocks 1210, 1212 and 1214 are similar to blocks 1110, 1114, 1116, and 1118 in FIG. 11.

Returning to decision block 1210, if the result is NO, the logic proceeds to a block 1216 in which a virtual to physical address translation is performed, identifying the far memory device storing the data and the physical address corresponding to the location of the data on that far memory device. The data is then read from the far memory device in a block 1218.

As discussed above, in some embodiments the pages that are copied from the far memory address space into the near memory address space based on observing access patterns of the far memory address space. Accordingly, in a block 1220 the access pattern data is updated. For example, in one embodiment a frequency of access of memory pages in the far memory address space is maintained, such as by using an access count and a timestamp. Other types of access pattern data may be maintained/updated in a similar manner.

In a decision block 1222 a determination is made whether to copy the memory page from the far memory virtual address space into the near memory virtual address space, which is performed by copying the data in the memory page from the far memory device on which the memory page is stored to one of the near memory devices. In one embodiment, the determination is made based on the access pattern data. For example, if an access pattern frequency exceeds a threshold or an access count within a predefined period exceeds a threshold, the memory page is copied from the far memory device to a near memory device.

This operation is somewhat analogous to copying a cacheline into a processor cache, except that full memory pages are being copied as opposed to cachelines, which are much smaller. As with adding a new cacheline to a cache, before the new memory page can be added an existing memory page has to be evicted (if the near memory virtual address space allocated to the VM through which the memory access request is made is already full; if not, a page eviction is not necessary). In instances in which this near memory virtual address space is already full, a page eviction policy is implemented to determine what page to effect. For example, various types of well-known eviction policies may be used, such as a least recently used (LRU) eviction policy, a least frequently used (LFU), pseudo LRU, Bélády's Algorithm, etc. In one embodiment, access patterns to both the near memory virtual address space and the far memory address spaces are monitored, with the page to evict determined, at least in part, based on the observed access pattern of that page.

As further shown in flowchart 1200, the page evicted in block 1224 is replaced with the page copied from the far memory device to the near memory device. The page map entries for both the evicted page and new page are updated in a block 1228. For instance, the entry for the evicted page is removed, and a new entry for the new page is added to the page map.

Data Deduplication

Another aspect of some embodiments is support for a feature called "data deduplication," or "data dedup." Under this feature, cachelines having predetermined data patterns are stored in a manner that requires less storage then the nominal cacheline sizes. This enables the effective size for blocks of memory, such as memory pages, to be increased, enabling more data to be stored in a given block/page.

Figure 13:
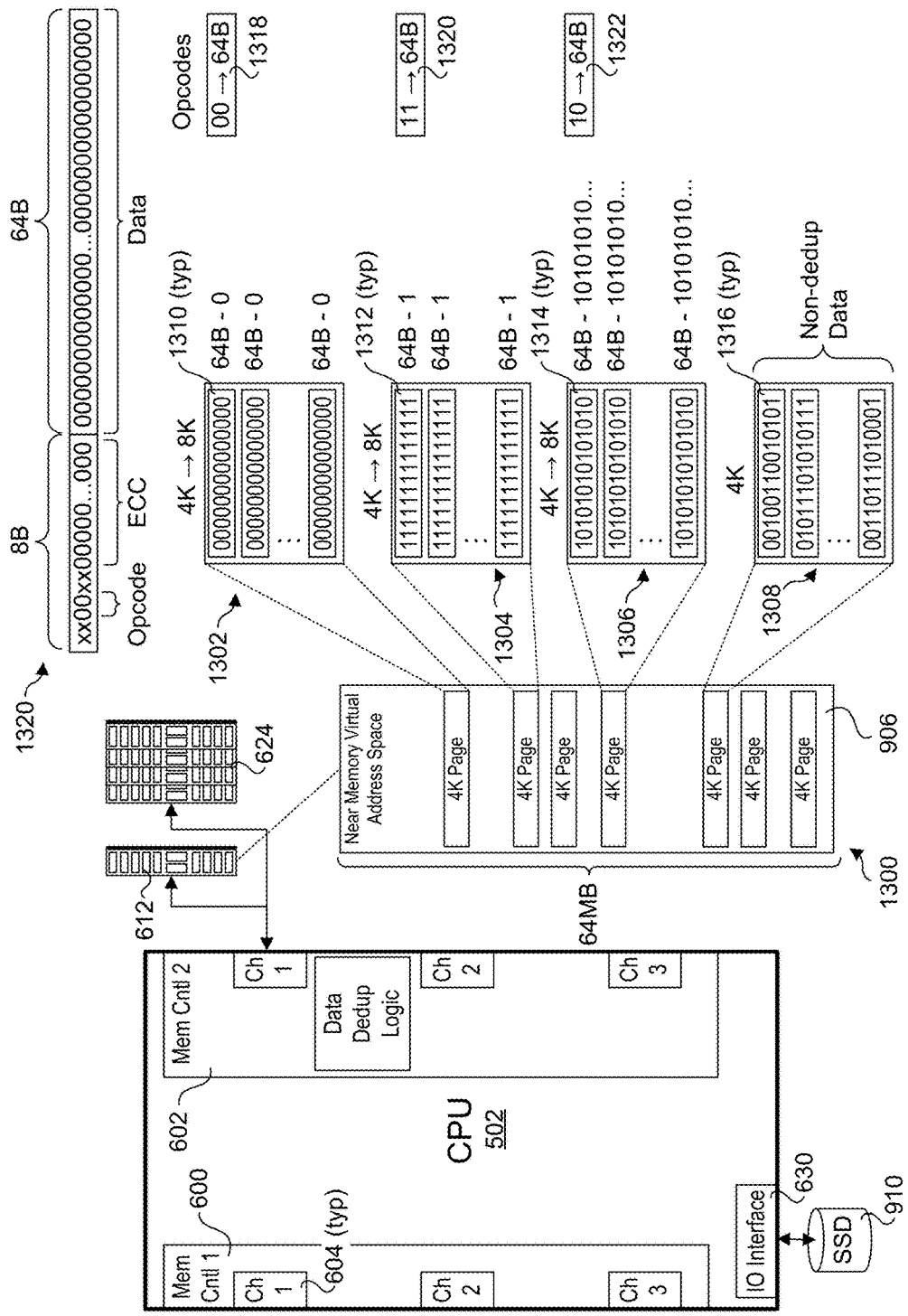
FIG. 13 is schematic diagram illustrating aspects of one embodiment of a data deduplication scheme, accordingly to one embodiment.

One embodiment of this scheme is schematically illustrated in FIG. 13. As before, a near memory virtual address space 1300 corresponding to near memory DIMM 612 is partitioned into multiple 4K memory pages. Further details of four of these 4K memory pages are depicted as memory pages 1302, 1304, 1306 and 1308. Each cacheline in memory page 1302 contains a data pattern 1310 of all '0's. Each cacheline in memory page 1304 contains a data pattern 1312 of all '1's. Each cacheline in memory page 1306 contains a data pattern 1314 of alternating '1's and '0's (i.e., 10101010 . . . ). Meanwhile, cachelines 1316 in memory page 1308 are depicted as containing random data, which is illustrative of data as it would normally be stored. Each of data patterns 1310, 1312, and 1314 contain duplicated data, and thus are candidates for data deduplication.

Cachelines 1304 and 1306 contain a data pattern of all '0's, while cachelines 1308 and 1312 contain a data pattern of all '1's. Meanwhile, cacheline 1312 contains a data pattern of alternating '1's and '0's (i.e., 10101010 . . . ). Each of these data patterns contain duplicated data, and thus are candidates for data deduplication.

Under one embodiment of data deduplication, OpCodes are used to identify bit patterns that are duplicated. For example, FIG. 13 shows three exemplary OpCodes 1318, 1318, and 1320. OpCode 1318 is used for dedup data stored in a cacheline as all '0's, and has an OpCode value of '00'. OpCode 1320 is used for dedup data stored in a cacheline as all '1's, and has an OpCode value of '11'. OpCode 1322 is used for dedup data stored in a cacheline as a data pattern of alternating '1's and '0's (i.e., 10101010 . . . ), and has an OpCode value of '10'. As further shown in FIG. 13, each of the cachelines in memory page 1302 has an OpCode of '00', each of the cachelines in memory page 1304 has an OpCode of '11', while each of the cachelines in memory page 1306 has an OpCode of '10'.

In one embodiment, the OpCodes are stored as part of the page map data. For example, a page map entry would include an additional column in which a dedup OpCode is stored.

Data deduplication may also be implemented at the cacheline level. In one embodiment, near memory cachelines are 72 Bytes long (in memory), with 8 B used for Error Correction Code (ECC) data and metadata, with 64 B used for storing the actual cacheline data. When the cacheline is accessed from memory, the memory controller verifies the ECC and metadata and returns 64 B of data to the processor core—that is the 64 B of actual cacheline data is written to one of the processor core's caches. When data is written to near memory, the 8 B of ECC data and metadata are added to the cacheline data.

In one embodiment, far memory employs cachelines that include 256 B of data, while another embodiment employs cachelines including 128 B of data. Each of these embodiments also include ECC and metadata, and operate in a similar manner to near memory, but the cachelines include 256 B or 128 B of data rather than 64 B of data.

For data deduplication at the cacheline level, in one embodiment the OpCodes are stored in the cachelines, as part of the metadata. One example of this approach is illustrated in FIG. 13 in a cacheline 1320. As shown, cacheline 1320 is 72 Bytes long, and includes 64 B of data. The 8 extra Bytes are used for ECC data, along with metadata that includes an OpCode, which in one embodiment is encoded at an offset from the start of cacheline 1320.

In another embodiment, the OpCodes are only used between communication between the memory controller and DIMM, but the DIMM controller decodes the OpCode and stores actual content. In this concept, the OpCodes are used to mainly reduce the communication bandwidth.

Generally, data patterns such as data patterns 1310, 1312, and 1314 may be used when blocks of memory are allocated to a process (for example, Malloc), or when a memory object is deleted. In the latter case, this practice eliminates potential malicious access to memory via a dangling pointer or other hacking schemes for accessing memory.

Figure 14:
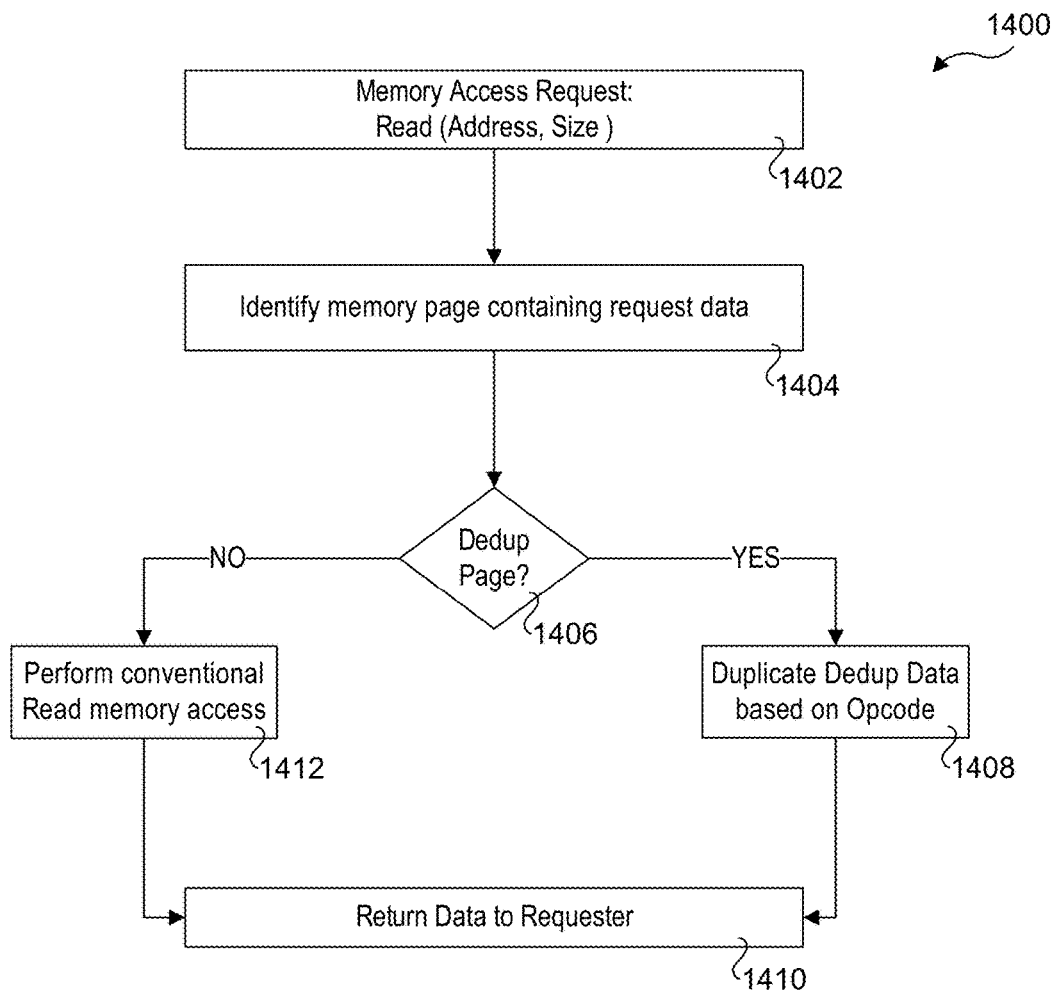
FIG. 14 is a flowchart illustrating operations and logic for performing a memory read using a two-level memory access mechanism with data deduplication, according to one embodiment.

Operations and logic for performing a memory read, according to one embodiment, are shown in a flowchart 1400 of FIG. 14. In a block 1402 a memory read request is issued by a requester (e.g., an operating system on behalf of an application running on the OS). As with conventional memory read requests, the request includes the virtual memory address at the start of the requested data, along with a size of the data. In a block 1404, the memory page containing the requested data is identified. Generally, the memory page may be identified using the operations and logic shown in flowchart 1200 of FIG. 12, as discussed above.

In a decision block 1406 a determination is made to whether the memory page identified is a dedup memory page (that is, a page containing deduplication data). In one embodiment in which page map data for memory pages includes dedup OpCodes, this may be identified by inspecting the dedup OpCode for the page. If the page is a dedup page, the answer to decision block 1406 is YES, and the logic proceeds to a block 1408 in which the dedup data is duplicated based on the OpCode. For example, if the dedup OpCode is '00' the data will be duplicated such that each of the relevant cacheline's is filled with '0's. Similarly, if the dedup OpCode is '11' the data will be duplicated such that each of the relevant cacheline's is filled with '1's. The duplicated data is then returned to the requester in a block 1410.

If the memory page does not contain deduplicated data, the answer to decision block 1406 will be NO. As a result, the requested data will be access from memory in the conventional manner in a block 1412 and returned to the requester in block 1410.

Figure 15:
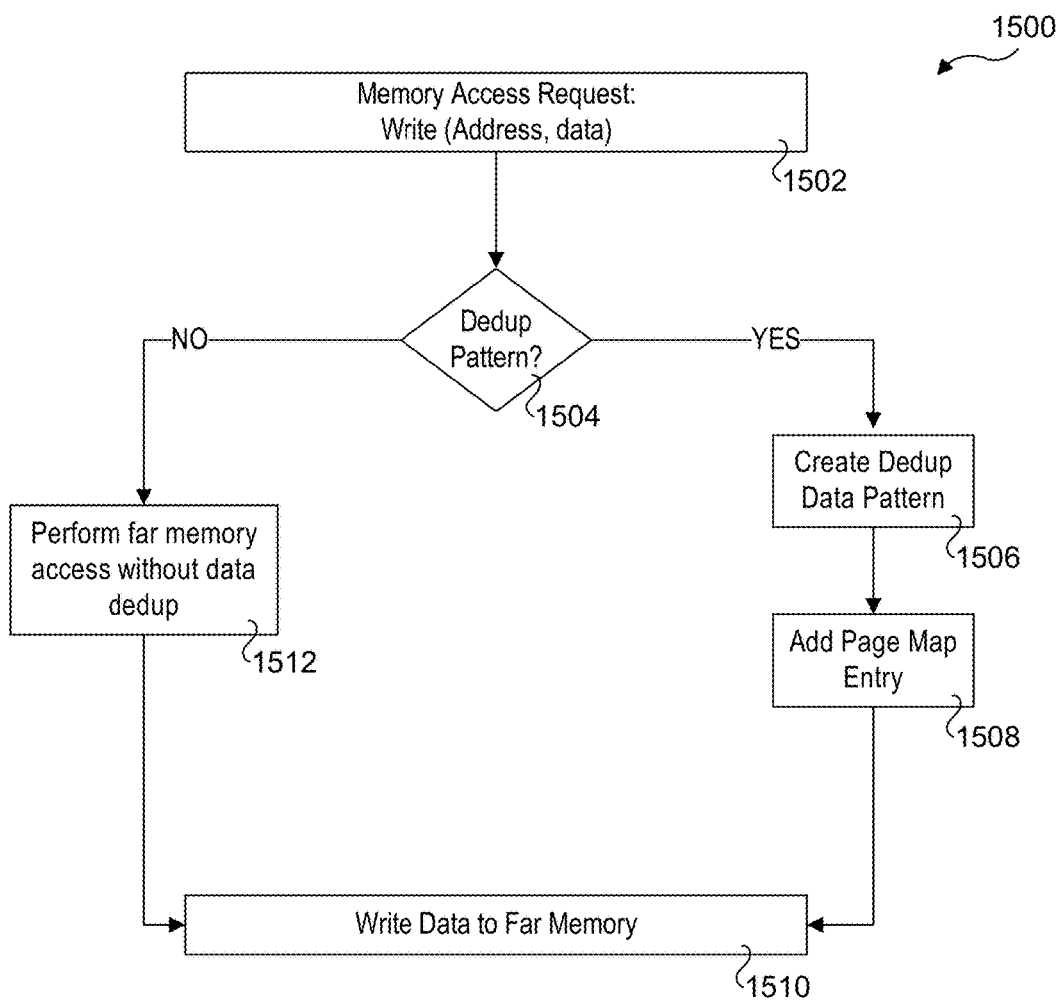
FIG. 15 is a flowchart illustrating operations and logic for performing a memory write using a two-level memory access mechanism with data deduplication, according to one embodiment.

FIG. 15 shows a flowchart illustrating operations and logic for implementing a memory write, according to one embodiment. In a block 1502 a memory write is requested, including the starting address at which the data is to be written, along with the data. In one embodiment, a compiler may include support for a write instruction that specifies a dedup data pattern to be used, along with a size (not shown). For example, such an instruction could be generated in conjunction with compiling a Malloc or delete instruction in C or C++ source code.

More generally, a memory read and write requests may be issued by software or may result from a cache writeback, depending on the context of the request and whether the data is currently in a processor cache. For example, in one embodiment if the memory type range register (MTRR) corresponding to the address of the requested data is marked "WB" (Write-Back), when the processor core accesses the memory it will go through is Level1 (L1) and Level2 (L2) core cache. If the cacheline corresponding to the request is not found in L1/L2, a corresponding memory read or write access request is issued to the memory controller.

In one embodiment, if the MTRR or page table entry corresponding to the memory location containing the requested data is marked "UC" (uncached), then when the core performs the access, it will skip L1/L2 and directly go to the memory controller. The memory controller in-turn performs the cacheline read or cacheline write, as applicable.

In a decision block 1504, a determination is made to whether a dedup pattern is to be written. If the answer is YES, the logic proceeds to a block 1506 in which data using the dedup data pattern is created. In a block 1508, a corresponding page map entry with the dedup OpCode is added, and the deduplicated data having the data pattern is written to far memory in a block 1510. If the data to be written isn't to be deduplicated, the answer to decision block 1504 is NO, and the logic proceeds to a block 1512 in which a far memory access is performed without data deduplication. A memory write of the non-dedup data is then performed in block 1510.

Example Memory Access Scenarios

The following is a non-limiting list of example scenarios.
1. Hardware two-level memory address range: Lower latency memory, such as DDR4 or DDR5 memory, is used as near memory, while higher latency memory, such as 3D XPoint DIMM, operates as far memory
2. A range of DDR4 or DDR5 memory configures as one-level memory (i.e., normal memory operation), but operates as near memory for Software two-level memory
3. A range of higher-latency memory (e.g., 3D XPoint memory) configures as one-level memory but operates as far memory for Software two-level memory
4. A portion of memory is accessed from an NVMe drive.

Under scenario 1, the full address range is visible to the application (e.g., visible to an operating system), and is managed by the two-level memory access mechanism implemented via hardware. Under scenario 2, the range of DDR4 or DDR5 memory that operates as near memory is not visible to the application, and is managed by software-based two-level memory management code. Under scenario 3, the memory capacity is visible to the application, and is managed by software-based two-level memory management code. Under scenario 4, the capacity of the NVMe drive storage space is visible to the application as memory (rather than storage). In one embodiment, it is managed by software-based two-level memory management code, either operating as near memory or far memory. In another embodiment, the NVMe data is cached by 3D XPoint memory, which is cached by DDR4/DDR5 memory.

Under one embodiment, if the application memory access pattern is not predictable, it is directed to the hardware-based two-level memory access mechanism. If the access pattern is predictable, the software-based two-level management code is used. If the memory access is block-based, the NVMe drives operate as far memory, while if the memory access is cacheline or lower than block size based, then 3D XPoint DIMMs are used along with accounting for memory performance requirements.

Further aspects of the subject matter described herein are set out in the following numbered clauses:

1. A method comprising:

implementing a two-level memory access mechanism for a compute platform including a processor operatively coupled to one or more near memory devices and one or more far memory devices, wherein an access latency for a near memory device is less than an access latency for a far memory device, at least a portion of memory in the one or more near memory devices storing data in data units having addresses in a near memory virtual address space and at least a portion of memory in the one or more far memory devices storing data in data units having addresses in a far memory address space;

storing data in data units having addresses in the near memory virtual address space and in data units having addresses in the far memory virtual address space, a portion of the data that is stored being stored in data units in both the near memory virtual address space and the far memory virtual address space;

in response to a memory read access request including a virtual memory address corresponding to a data unit storing data to be accessed, determining whether the data is stored in a near memory device, and, if so, accessing the data from the near memory device; otherwise, accessing the data from a far memory device.

2. The method of clause 1, further comprising:
monitoring access patterns to data in the far memory virtual address space; and
based on the access patterns, copying data units from the far memory address space into the near memory address space.

3. The method of clause 2, further comprising:
executing a plurality of processes on the processor;
assigning levels of service to at least a portion of the plurality of processes; and
determining, at least in part, whether to copy data units from the far memory address space into the near memory address space based on a level of service assigned to a process that requests access to data that is not stored in the near memory address space.

4. The method of clause 1, further comprising mapping, for each data unit in the near memory virtual address space, an address of the data unit in the near memory virtual address space to an address of the data unit in the far memory virtual address space.

5. The method of clause 1, wherein the near memory devices are volatile memory devices and the far memory devices are non-volatile memory devices.

6. The method of clause 5, wherein the non-volatile memory devices include three-dimensional crosspoint memory devices.

7. The method of clause 1, wherein the processor is operatively coupled to the one or more far memory devices via a fabric.

8. The method of clause 7, wherein the non-volatile memory devices comprise storage class memory devices that are coupled to the fabric.

9. The method of clause 7, wherein the compute platform is located in a first drawer in a rack and the one or more far memory devices are located in a second drawer in the rack.

10. The method of clause 1, wherein the data units comprise memory pages.

11. The method of clause 1, wherein the one or more far memory devices comprise one or more block storage devices, and the data units comprise storage blocks.

12. The method of clause 1, wherein the compute platform further includes a hypervisor hosting a plurality of virtual machines (VMs), further comprising:
allocating, via the hypervisor, respective portions of the far memory address space to the plurality of VMs;
allocating, via the hypervisor, respective portions of the near memory address space to the plurality of VMs; and
mapping, for each of the plurality of VMs, the portion of the near memory virtual address allocated to that VM with the portion of far memory address space allocated to that VM.

13. The method of clause 12, further comprising:
for at least one VM,
observing memory access request patterns made by the operating system running on the VM; and
selectively copying data from data units in the portion of far memory virtual address space allocated to that VM to data units in the portion of near memory virtual address space allocated to that VM based on the memory access patterns.

14. The method of clause 1, wherein the memory read access request is a first memory access request, further comprising:
determining whether a second memory access request is a memory read request or a memory write request, the second memory access request including a virtual address at which data is to be; and
if the second memory access is a memory write request, writing data to a data unit in the far memory virtual address space corresponding to the virtual address.

15. A system, comprising:
a compute platform including a processor having a memory controller;
one or more near memory devices, communicatively coupled to the memory controller; and
one or more far memory devices, communicatively coupled to the processor;
a storage device, communicatively coupled to the processor;
wherein an access latency for a far near memory device is less than an access latency for a far memory device, at least a portion of the memory in the one or more near memory devices configured to store data in data units having addresses in a near memory virtual address space and at least a portion of the memory in the one or more far memory devices configured to store data in data units having addresses in a far memory address space, and wherein the system is configured, to,
store data in data units having addresses in the near memory virtual address space and in data units having addresses in the far memory virtual address space, a portion of the data that is stored being stored in data units in both the near memory virtual address space and the far memory virtual address space;
in response to a memory read access request including a virtual memory address corresponding to a data unit storing data to be accessed,
determine whether the data is stored in a near memory device, and, if so,
access the data from the near memory device; otherwise,
access the data from a far memory device.

16. The system of clause 1, wherein the system is further configured to:
monitor access patterns to data in the far memory virtual address space; and
based on the access patterns, copy data units from the far memory address space into the near memory address space.

17. The system of clause 16, wherein the system is further configured to:
execute a plurality of processes on the processor;
assign levels of service to at least a portion of the plurality of processes; and
determining, at least in part, whether to copy data units from the far memory address space into the near memory address space based on a level of service assigned to a process that requests access to data that is not stored in the near memory address space.

18. The system of clause 15, wherein the system is further configured to map, for each data unit in the near memory virtual address space, an address of the data unit in the near memory virtual address space to an address of the data unit in the far memory virtual address space.

19. The system of clause 15, wherein the near memory devices are volatile memory devices and the far memory devices are non-volatile memory devices.

20. The system of clause 19, wherein the non-volatile memory devices include three-dimensional crosspoint memory devices.

21. The system of clause 15, further comprising a fabric to which each of the processor and the one or more far memory devices are operatively coupled.

22. The system of clause 21, wherein the non-volatile memory devices comprise storage class memory devices that are coupled to the fabric.

23. The system of clause 21, further comprising:
a rack;
a plurality of drawers, installed in the rack;
a first drawer in which the compute platform is installed; and
a second drawer, in which the one or more far memory devices are installed.

24. The system of clause 15, wherein the data units comprise memory pages.

25. The system of clause 15, wherein the one or more far memory devices comprise one or more block storage devices, and the data units comprise storage blocks.

26. The system of clause 15, further comprising:
a storage device; operatively coupled to the processor;
a plurality of instructions comprising a hypervisor, stored one the storage device, configured to be executed on the processor to,
host a plurality of virtual machines (VMs);
allocate respective portions of the far memory address space to the plurality of VMs;
allocate respective portions of the near memory address space to the plurality of VMs; and
map, for each of the plurality of VMs, the portion of the near memory virtual address allocated to that VM with the portion of far memory address space allocated to that VM.

27. The system of clause 26, wherein the hypervisor is further configured to:
for each VM,
observe memory access request patterns made by the operating system running on the VM; and
selectively copy data from data units in the portion of far memory virtual address space allocated to that VM to data units in the portion of near memory virtual address space allocated to that VM based on the memory access patterns.

28. The system of clause 15, wherein the memory read access request is a first memory access request, and wherein the system is further configured to:
determine whether a second memory access request is a memory read request or a memory write request, the second memory access request including a virtual address at which data is to be; and
if the second memory access is a memory write request, write data to a data unit in the far memory virtual address space corresponding to the virtual address.

29. A non-transient machine readable medium having instructions stored thereon, configured to be executed on a processor in a compute platform including one or more near memory devices and one or more far memory devices operatively coupled to the processor, wherein an access latency for a near memory device is less than an access latency for a far memory device, at least a portion of the memory in the one or more near memory devices storing data in data units having addresses in a near memory virtual address space and at least a portion of the memory in the one or more far memory devices storing data in data units having addresses in a far memory address space, wherein the instruction, when executed enable the compute platform to:
store data in data units having addresses in the near memory virtual address space and in data units having addresses in the far memory virtual address space, a portion of the data that is stored being stored in data units in both the near memory virtual address space and the far memory virtual address space;
in response to a memory read access request including a virtual memory address corresponding to a data unit storing data to be accessed,
determine whether the data is stored in a near memory device, and, if so,
access the data from the near memory device; otherwise, access the data from a far memory device.

30. The non-transient machine readable medium of clause 29, wherein execution of the instructions further enables the compute platform to:
monitor access patterns to data in the far memory virtual address space; and
based on the access patterns, copy data units from the far memory address space into the near memory address space.

31. The non-transient machine readable medium of clause 30, wherein the compute platform is configured to execute a plurality of processes on the processor, at least a portion of the processes having an associated level of service, and wherein execution of the instructions further enables the compute platform to:
determine, at least in part, whether to copy data units from the far memory address space into the near memory address space based on a level of service assigned to a process that requests access to data that is not stored in the near memory address space.

32. The non-transient machine readable medium of clause 29, wherein execution of the instructions further enables the compute platform to map, for each data unit in the near memory virtual address space, an address of the data unit in the near memory virtual address space to an address of the data unit in the far memory virtual address space.

33. The non-transient machine readable medium of clause 29, wherein the data units comprise memory pages.

33. The non-transient machine readable medium of clause 29, wherein the one or more far memory devices comprise one or more block storage devices, and the data units comprise storage blocks.

34. The non-transient machine readable medium of clause 29, wherein the plurality of instructions include instructions for implementing a hypervisor that is configured to host a plurality of virtual machines (VMs), and wherein execution of the instructions further enables the compute platform to:
allocate respective portions of the far memory address space to the plurality of VMs;
allocate respective portions of the near memory address space to the plurality of VMs; and
map, for each of the plurality of VMs, the portion of the near memory virtual address allocated to that VM with the portion of far memory address space allocated to that VM.

35. The non-transient machine readable medium of clause 34, wherein the hypervisor is further configured to:
for each VM,
observe memory access request patterns made by the operating system running on the VM; and
selectively copy data from data units in the portion of far memory virtual address space allocated to that VM to data units in the portion of near memory virtual address space allocated to that VM based on the memory access patterns.

36. The non-transient machine readable medium of clause 29, wherein the memory read access request is a first memory access request, and wherein execution of the instructions further enables the compute platform to:
determine whether a second memory access request is a memory read request or a memory write request, the second memory access request including a virtual address at which data is to be; and
if the second memory access is a memory write request, write data to a data unit in the far memory virtual address space corresponding to the virtual address.

37. A method comprising:

implementing a two-level memory access mechanism for a compute platform including a processor operatively coupled to one or more near memory devices and one or more far memory devices, wherein an access latency for a near memory device is less than an access latency for a far memory device, at least a portion of memory in the one or more near memory devices storing data in data units having addresses in a near memory virtual address space and at least a portion of memory in the one or more far memory devices storing data in data units having addresses in a far memory address space;

in response to a memory write request including original data to be written having a predetermined pattern and an original size and having a virtual address, writing data representative of the original data and having a reduced size smaller than the original size to at least one of a near memory device and a far memory device at an address corresponding to the virtual address.

38. The method of clause 37, wherein the predetermined pattern is a pattern of '0's.

39. The method of clause 37, wherein the predetermined pattern is a pattern of '1's.

40. The method of clause 37, wherein the predetermined pattern is a pattern of alternating '1's and '0's.

41. The method of any of clauses 37-40, wherein respective OpCodes are defined for respective predetermined patterns, and wherein data is stored in cachelines including a data portion and a metadata portion, further comprising:

writing the data representative of the original data to one or more cachelines including data content and metadata to the to at least one of a near memory device and a far memory device at an address corresponding to the virtual address, wherein the metadata portion in the one or more cachelines include an OpCode identifying the predetermined data pattern.

42. The method of clause 41, wherein the data portion of the one or more cachelines contains data having the predetermined pattern.

43. The method of clause 41, wherein the memory write request includes an OpCode identifying the data pattern to be written, the method further comprising:

generating the data portion and metadata portion including the OpCode for the one or more cachelines via a memory controller.

44. The method of any of clauses 37-40, wherein respective OpCodes are defined for respective predetermined patterns, and wherein data is stored in memory pages, the further comprising:

writing the data representative of the original data to one or more memory pages; and one of generating or updating memory page map data for each of the one or more memory pages with an OpCode identifying the predetermined data pattern.

45. The method of clause 44, wherein the memory page map data is generated or updated by software.

46. The method of any of clauses 37-45, further comprising, in response to a memory read request including the virtual address, retrieving the data representative of the original data from one of the near memory device and the far memory device;

regenerating the original data from the data representative of the original data;

returning the original data to service the memory read request.

47. The method of clause 46, wherein respective OpCodes are defined for respective predetermined patterns, and wherein data is stored in cachelines including a data portion and a metadata portion, further comprising:

retrieving one or more cachelines containing the data representative of the original data from one of the near memory device and the far memory device;

for each cacheline, inspecting the metadata for the cacheline to identify the OpCode; and regenerating a portion of the original data corresponding to a portion of data representative of the original data stored in that cacheline.

48. The method of clause 46 or 47, wherein the original data is regenerated by a memory controller.

49. The method of clause 46, wherein respective OpCodes are defined for respective predetermined patterns, and wherein data is stored in memory pages, further comprising:

retrieving the data representative of the original data from one or more memory pages in one of the near memory device and the far memory device;

for each memory page, looking up page map data to identify an OpCode associated with the memory page; and regenerating a portion of the original data corresponding to a portion of data representative of the original data stored in that memory page based on the predetermined data pattern defined by the OpCode that is identified.

50. The method of clause 46 or 49, wherein the original data is regenerated by a memory controller.

51. The method of clause 46 or 49, wherein the original data is regenerated by software.

52. A system, comprising:

a compute platform including a processor having a memory controller;

one or more near memory devices, communicatively coupled to the memory controller; and one or more far memory devices, communicatively coupled to the processor;

a storage device, communicatively coupled to the processor;

wherein an access latency for a far near memory device is less than an access latency for a far memory device, at least a portion of the memory in the one or more near memory devices configured to store data in data units having addresses in a near memory virtual address space and at least a portion of the memory in the one or more far memory devices configured to store data in data units having addresses in a far memory address space, and wherein the system is configured to, in response to a memory write request including original data to be written having a predetermined pattern and an original size and having a virtual address, write data representative of the original data and having a reduced size smaller than the original size to at least one of a near memory device and a far memory device at an address corresponding to the virtual address.

53. The system of clause 52, wherein the predetermined pattern is a pattern of '0's.

54. The system of clause 52, wherein the predetermined pattern is a pattern of '1's.

55. The system of clause 52, wherein the predetermined pattern is a pattern of alternating '1's and '0's.

56. The system of any of clauses 52-55, wherein respective OpCodes are defined for respective predetermined patterns, and wherein data is stored in cachelines including a data portion and a metadata portion, wherein the system is further configured to write the data representative of the original data to one or more cachelines including data content and metadata to the to at least one of a near memory device and a far memory device at an address corresponding to the virtual address, wherein the metadata portion in the one or more cachelines include an OpCode identifying the predetermined data pattern.

57. The system of clause 56, wherein the data portion of the one or more cachelines contains data having the predetermined pattern.

58. The system of clause 56, wherein the memory write request includes an OpCode identifying the data pattern to be written, and wherein the system generates the data portion and metadata portion including the OpCode for the one or more cachelines via a memory controller.

59. The system of any of clauses 52-55, wherein respective OpCodes are defined for respective predetermined patterns, and wherein data is stored in memory pages, and wherein the system is further to:

write the data representative of the original data to one or more memory pages; and one of generate or update memory page map data for each of the one or more memory pages with an OpCode identifying the predetermined data pattern.

60. The system of clause 59, wherein the memory page map data is generated or updated by software running on the system.

61. The system of any of clauses 52-60, further to:

in response to a memory read request including the virtual address, retrieve the data representative of the original data from one of the near memory device and the far memory device;

regenerate the original data from the data representative of the original data;

return the original data to service the memory read request.

62. The system of clause 61, wherein respective OpCodes are defined for respective predetermined patterns, and wherein data is stored in cachelines including a data portion and a metadata portion, further to:

retrieve one or more cachelines containing the data representative of the original data from one of the near memory device and the far memory device;

for each cacheline, inspect the metadata for the cacheline to identify the OpCode; and regenerate a portion of the original data corresponding to a portion of data representative of the original data stored in that cacheline.

63. The system of clause 61 or 62, wherein the original data is regenerated by a memory controller.

64. The system of clause 61, wherein respective OpCodes are defined for respective predetermined patterns, and wherein data is stored in memory pages, the system further to:

retrieve the data representative of the original data from one or more memory pages in one of the near memory device and the far memory device;

for each memory page, look up page map data to identify an OpCode associated with the memory page; and regenerate a portion of the original data corresponding to a portion of data representative of the original data stored in that memory page based on the predetermined data pattern defined by the OpCode that is identified.

65. The system of clause 61 or 64, wherein the original data is regenerated by a memory controller.

66. The system of clause 61 or 64, wherein the original data is regenerated by software.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Letters, such as 'M' and 'N' in the foregoing detailed description and drawings are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   implementing a two-level memory access mechanism for a compute platform installed in one of a first chassis, drawer, tray or sled communicatively coupled, via a fabric, to one of a second chassis, drawer, tray or sled in which one or more far memory devices are installed, the compute platform including a processor operatively coupled to one or more near memory devices and enabled to access the one or more far memory devices via the fabric, wherein an access latency for a near memory device is less than an access latency for a far memory device, at least a portion of memory in the one or more near memory devices storing data in data units having addresses in a near memory virtual address space and at least a portion of memory in the one or more far memory devices storing data in data units having addresses in a far memory virtual address space;
   executing a plurality of processes on the processor;
   assigning levels of service to at least a portion of the plurality of processes;
   storing data in data units having addresses in the near memory virtual address space and in data units having addresses in the far memory virtual address space, a portion of the data that is stored being stored in data units in both the near memory virtual address space and the far memory virtual address space;
   in response to a memory read access request including a virtual memory address corresponding to a data unit storing data to be accessed,
      determining whether the data is stored in a near memory device, and, if so,
      accessing the data from the near memory device; otherwise,
      accessing the data from a far memory device via the fabric;
   monitoring access patterns to data in the far memory virtual address space;
   based on the access patterns, copying data units from the far memory virtual address space into the near memory virtual address space; and
   determining, at least in part, whether to copy data units from the far memory virtual address space into the near memory virtual address space based on a level of service assigned to a process that requests access to data that is not stored in the near memory virtual address space.

2. The method of claim 1, further comprising mapping, for each data unit in the near memory virtual address space, an address of the data unit in the near memory virtual address space to an address of the data unit in the far memory virtual address space.

3. The method of claim 1, wherein the near memory devices are volatile memory devices and the far memory devices are non-volatile memory devices.

4. The method of claim 3, wherein the non-volatile memory devices include three-dimensional crosspoint memory devices.

5. The method of claim 1, further comprising accessing a far memory device over the fabric using a Non-volatile Memory Express over Fabric (NVMe-oF) protocol.

6. The method of claim 5, wherein the far memory device comprises a storage class memory device.

7. The method of claim 1, wherein the data units comprise memory pages.

8. The method of claim 1, wherein the one or more far memory devices comprise one or more block storage devices, and the data units comprise storage blocks.

9. A system, comprising:
a compute platform including a processor having a memory controller;
one or more near memory devices, communicatively coupled to the memory controller;
a host fabric interface (HFI), communicatively coupled to the processor and communicatively coupled to a fabric including a plurality of fabric links and at least one fabric switch; and
one or more far memory devices, communicatively coupled to the fabric;
wherein an access latency for a near memory device is less than an access latency for a far memory device, at least a portion of the memory in the one or more near memory devices configured to store data in data units having addresses in a near memory virtual address space and at least a portion of the memory in the one or more far memory devices configured to store data in data units having addresses in a far memory virtual address space, and wherein the system is configured to,
execute a plurality of processes on the processor;
assign levels of service to at least a portion of the plurality of processes;
store data in data units having addresses in the near memory virtual address space and in data units having addresses in the far memory virtual address space, a portion of the data that is stored being stored in data units in both the near memory virtual address space and the far memory virtual address space;
in response to a memory read access request including a virtual memory address corresponding to a data unit storing data to be accessed,
determine whether the data is stored in a near memory device, and, if so,
access the data from the near memory device; otherwise,
access the data from a far memory device via the fabric;
monitor access patterns to data in the far memory virtual address space;
based on the access patterns, copy data units from the far memory virtual address space into the near memory virtual address space
determine, at least in part, whether to copy data units from the far memory virtual address space into the near memory virtual address space based on a level of service assigned to a process that requests access to data that is not stored in the near memory virtual address space.

10. The system of claim 9, wherein the system is further configured to map, for each data unit in the near memory virtual address space, an address of the data unit in the near memory virtual address space to an address of the data unit in the far memory virtual address space.

11. The system of claim 9, wherein the near memory devices are volatile memory devices and the far memory devices are non-volatile memory devices.

12. The system of claim 11, wherein the non-volatile memory devices include three-dimensional crosspoint memory devices.

13. The system of claim 9, wherein the system is further configured to access the one or more far memory devices over the fabric using a Non-volatile Memory Express over Fabric (NVMe-oF) protocol.

14. The system of claim 9, wherein the data units comprise memory pages.

15. The system of claim 9, wherein the one or more far memory devices comprise one or more block storage devices, and the data units comprise storage blocks.

16. A non-transient machine readable medium having instructions stored thereon, configured to be executed on a processor in a compute platform including one or more near memory devices and one or more far memory devices operatively coupled to the processor, wherein an access latency for a near memory device is less than an access latency for a far memory device, at least a portion of the memory in the one or more near memory devices storing data in data units having addresses in a near memory virtual address space and at least a portion of the memory in the one or more far memory devices storing data in data units having addresses in a far memory virtual address space, wherein the compute platform is configured to execute a plurality of processes on the processor, at least a portion of the processes having an associated level of service, and wherein the instructions, when executed enable the compute platform to:
store data in data units having addresses in the near memory virtual address space and in data units having addresses in the far memory virtual address space, a portion of the data that is stored being stored in data units in both the near memory virtual address space and the far memory virtual address space;
in response to a memory read access request including a virtual memory address corresponding to a data unit storing data to be accessed,
determine whether the data is stored in a near memory device, and, if so,
access the data from the near memory device; otherwise,
access the data from a far memory device;
monitor access patterns to data in the far memory virtual address space;
based on the access patterns, copy data units from the far memory virtual address space into the near memory virtual address space; and
determine, at least in part, whether to copy data units from the far memory virtual address space into the near memory virtual address space based on a level of service assigned to a process that requests access to data that is not stored in the near memory virtual address space.

17. The non-transient machine readable medium of claim 16, wherein execution of the instructions further enables the compute platform to map, for each data unit in the near memory virtual address space, an address of the data unit in the near memory virtual address space to an address of the data unit in the far memory virtual address space.

18. The non-transient machine readable medium of claim 16, wherein the data units comprise memory pages.

19. The non-transient machine readable medium of claim 16, wherein the one or more far memory devices comprise one or more block storage devices, and the data units comprise storage blocks.

* * * * *